(12) United States Patent
Bier

(10) Patent No.: US 7,668,787 B2
(45) Date of Patent: Feb. 23, 2010

(54) METHOD, APPARATUS, AND PROGRAM PRODUCT FOR EFFICIENTLY ADDING ENTITIES AND RELATIONSHIPS IN A COMPREHENSION STATE OF A COLLECTION OF INFORMATION

(75) Inventor: Eric A Bier, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 581 days.

(21) Appl. No.: 11/426,915

(22) Filed: Jun. 27, 2006

(65) Prior Publication Data

US 2007/0299547 A1 Dec. 27, 2007

(51) Int. Cl.
*G06F 17/00* (2006.01)
*G06F 17/20* (2006.01)

(52) U.S. Cl. .............. 706/11; 707/5; 715/205; 715/736

(58) Field of Classification Search ............ None
See application file for complete search history.

(56) References Cited

U.S. PATENT DOCUMENTS

2004/0158455 A1* 8/2004 Spivack et al. .............. 704/9
2007/0124375 A1* 5/2007 Vasudevan et al. .......... 709/204

OTHER PUBLICATIONS

John R. Anderson, Peter L. Pirolli, Spread Of Activation, Journal Of Experimental Psychology: Learning, Memory, And Cognition, 1984, pp. 791-798, vol. 10.

Eric Bier, Lance Good, Kris Popat & Alan Newberger, A Document Corpus Browser for In-Depth Reading, Proceedings Of The Joint Conference On Digital Libraries, , 2004, pp. 87-96.

Eric A. Bier, Edward W. Tshak, Ed Chi, Entity Quick Click: Rapid Text Copying Based On Automatic Entity Extraction, Submitted to the Extended Abstracts of the Conference on Human Factors in Computing Systems, 2006, pp. 562-567.

Vannevar Bush, As We May Think, The Atlantic Monthly, Jul. 1945, pp. 35-67.

Ed H. Chi, Lichan Hong, Michelle Gumbrecht & Stuart K. Card, ScentHighlights: Highlighting Conceptually-Related Sentences during Reading, Proceedings of the 10th International Conference on Intelligent User Interfaces, 2005, pp. 272-274.

Thayne Coffman, Seth Greenblatt, & Sherry Marcus, Graph-Based Technologies for Intelligence Analysis, Communications of the ACM, Mar. 2004, pp. 45-47, No. 3.

(Continued)

*Primary Examiner*—David R Vincent
*Assistant Examiner*—Kalpana Bharadwaj
(74) *Attorney, Agent, or Firm*—Oliff & Berridge, PLC

(57) ABSTRACT

Aspects of the disclosed technology present a workspace window responsive to a relationship data structure that represents a comprehension state including a presentation set of an ordered set of text strings from an electronic document. The presentation set includes one or more identified strings. The workspace window can then receive a quick-click command invocation on the one or more identified strings and modifies the relationship data structure by adding an entity/relationship object to the relationship data structure responsive to the quick-click command invocation and the one or more identified strings. The application relates to sensemaking or maintaining a comprehension state of a document collection, by recording evidence, spatial hypertext, automatic highlighting, automating inferencing, reading recommendations, and reading through multiple documents.

27 Claims, 10 Drawing Sheets

OTHER PUBLICATIONS

Lance E. Good, Zoomable User Interfaces for the Authoring and Delivery of Slide Presentations, PhD Dissertation, , Department of Computer Science, University of Maryland, 2003, pp. 1-204 http://hdl.handle.net/1903/262.

Jamey Graham, The Reader's Helper: A Personalized Document Reading Environment, Proceedings of the SIGCHI Conference on Human Factors in Computing Systems, 1999, pp. 481-488.

David Jonker, William Wright, David Schroh, Pascale Proulx, & Brian Cort, Information triage with Trist, 2005 International Conference on Intelligence Analysis.

Hideki Kozima & Teiji Furugori, Similarity between Words Computed by Spreading Activation on an English Dictionary, Proceedings of the 5th Conference of the European Chapter of the Association for Computational Linguistics, EACL 1993, pp. 232-239.

Michael Wolverton, Pauline Berry, Ian Harrison, John Lowrance, David Morley, Andres Rodriguez, Enrique Ruspini, & Jerome Thomere, LAW: A Workbench for Approximate Pattern Matching in Relational Data, In Proceedings of the Fifteenth Innovative Application of Artificial Intelligence Conference, 2003.

William Wright, David Schroh, Pascale Proulx, Alex Skaburskis, & Brian Cort, Advances in nSpace—The Sandbox for Analysis, Poster at the 2005 International Conference on Intelligence Analysis, 2003.

\* cited by examiner

FIG. 5

METHOD, APPARATUS, AND PROGRAM PRODUCT FOR EFFICIENTLY ADDING ENTITIES AND RELATIONSHIPS IN A COMPREHENSION STATE OF A COLLECTION OF INFORMATION

STATEMENT REGARDING FEDERALLY SPONSORED RESEARCH OR DEVELOPMENT

This invention was made with Government support under MDA904-03-C-0404 awarded by ARDA. The Government has certain rights in this invention.

CROSS-REFERENCE TO RELATED APPLICATIONS

The following U.S. patent applications have been filed herewith: U.S. patent application Ser. No. 11/426,893, inventor Bier, entitled 'Method, Apparatus, and Program Product for Developing and Maintaining a Comprehension State of a Collection of Information'; U.S. patent application Ser. No. 11/426,919, having inventors Bier and Ishak, entitled 'Method, Apparatus, and Program Product for Efficiently Defining Relationships in a Comprehension State of a Collection of Information'; and U.S. patent application Ser. No. 11/426,925, inventors Bier and Ishak, entitled 'Method, Apparatus, and Program Product for Efficiently Detecting Relationships in a Comprehension State of a Collection of Information'.

BACKGROUND

1. Technical Field

The disclosed technology relates to the field of sensemaking.

2. Background Art

Knowledge workers such as scientists, attorneys, intelligence analysts, private and public investigators/detectives and financial analysts all perform tasks that require reading and synthesizing information from many documents. In such tasks, there is more information than a worker can hold in mind, so an essential element of the task is to record some of what has been learned in written or electronic form.

A knowledge worker often needs to track more information than can be held in human memory. As a result, the knowledge worker generally uses an evidence file or notebook to record relevant information by storing entities and hand-typed notes about the information. The captured information generally includes important relationships between the entities, between entities and other relationships, and between relationships.

A computer can be used to add value to the notes. For example, the knowledge worker can use full text search to locate a note (if he/she remembers words used in the note). In addition, if the notes include hypertext links, the worker can also use the links to re-find documents that have been previously read. However, the available computer assistance is limited because the computer does not have access to information about the relationships described in the documents, the relationships between those relationships, nor about which of the relationships are of greater or lesser interest to the knowledge worker. In addition, while a computer can search for text strings entered by the knowledge worker, it is unable to distinguish between text-snippets that are of interest to the knowledge worker and those that are not. Furthermore, the detailed note-taking process is extremely time-consuming and often the evidence filed does not include enough information to allow computerized assistance.

The disclosed technology builds on work related to recording evidence, spatial hypertext, automatic highlighting, automating inference, reading recommendations, and reading through multiple documents.

The disclosed technology differs from the Sandbox component of Oculus nSpace (Wright et al., *Advances in nSpace—the sandbox for analysis. Poster at the* 2005 *International Conference on Intelligence Analysis*) in that technology disclosed herein allows the knowledge worker to identify and record specific entities and relationships from documents as well as human-readable entities, and also allows the knowledge worker to associate a degree-of-interest value with each entity.

Single-mode snap-together operations have been used in the Niagara system (see: Good, L. E., *Zoomable User Interfaces for the Authoring and Delivery of Slide Presentations. PhD dissertation*, Department of Computer Science, University of Maryland, Oct. 27, 2003). In Niagara, the knowledge worker can group text snippets by moving them close together. The technology disclosed herein extends this approach by supporting two different kinds of grouping that result, respectively, from moving objects close together in vertical or horizontal directions, and by building a representation of all the entities and their relationships in the workspace.

Systems exist that employ automatic highlighting of text to aid reading and skimming. For example, the Scent Highlights component of the 3 Book system automatically highlights words related to a query and sentences containing them to direct the reader's attention during skimming. Likewise, the Reader's Helper (see: Graham, J. *The Reader's Helper: a personalized document reading environment. Proceedings of the SIGCHI Conference on Human Factors in Computing Systems (CHI '99)*, 1999, pages 481-488) highlights phrases judged to be similar to a reader's topic of interest. The technology disclosed herein extends this approach by highlighting both automatically-extracted entities and also phrases that have been given a high degree of interest rating by the knowledge worker.

Systems exist that automate the process of making inferences for intelligence analysis by using subgraph isomorphism to find suspicious patterns in a graph of entities and relationships (see: Coffman et al., *Graph-based technologies for intelligence analysis. Communications of the ACM*, Volume 47, Number 3 (March 2004), 45-47). SRI's Link Analysis Workbench (see: Wolverton et al. *LAW: A workbench for approximate pattern matching in relational data. In The Fifteenth Innovative Applications of Artificial Intelligence Conference (IAAI-*03), 2003) searches for entities in a graph that match a pattern of suspicious behavior either exactly or approximately. By contrast to these automated approaches, the disclosed technology provides interface tools for the knowledge workers to directly aid inference, based on whatever information the knowledge worker is viewing at any given moment.

Systems exist to assist a reader in selecting which document of a document collection is to be analyzed next. For example, Woodruff et al. in *Enhancing a Digital Book with a Reading Recommender (CHI* 2000) described a Reading Recommender that analyses the relationships based on textual similarity and co-citation between a set of documents and a list of documents read so far, and recommends new documents to examine. Bier in *A document corpus browser for in-depth reading. Proceedings of the Joint Conference on Digital Libraries (JCDL)*, 2004, 87-96 discloses a visualization showing at a glance the most highly rated unread documents, which act as an implicit recommendation. The disclosed technology builds on these approaches in at least two ways. First, because the knowledge worker assigns degree-of-interest values to individual entities, recommendations are based on a relatively rich model of the knowledge worker's interests. Second, the disclosed technology recommends both documents to read and also specific relationships/entities to learn more about.

Systems exist for reading through a "trail" of documents (see: Bush, V, "*As We May Think.*" *The Atlantic Monthly*, July 1945. Reprinted in Interactions, 3(2), 1996, pages 35-67). The technology disclosed herein provides a visualization of a set of trails, each of which corresponds to a query about an entity or set of entities.

The Oculus TRIST system (see: Jonker et al., *Information triage with TRIST*. 2005 *International Conference on Intelligence Analysis*), like the disclosed technology, shows an icon per document and uses graphical presentation to distinguish read and un-read documents. Trails presented by the technology disclosed herein differ from TRIST in that the trails are automatically created responsive to the knowledge worker's manipulations within the workspace window.

It would be advantageous to enable the knowledge worker to quickly identify particular phrases within a passage that correspond to important people, things, actions, or world events etc. and to provide a degree-of-interest value to these phrases. It would also be advantageous to suggest which electronic documents in a document collection to analyze based on the knowledge worker's apparent interest as determined from entities and their relationships and to assist the knowledge worker when making inferences.

BRIEF DESCRIPTION OF THE DRAWINGS

FIG. 5 illustrates an example of a workspace window;

DETAILED DESCRIPTION

Figure 1:
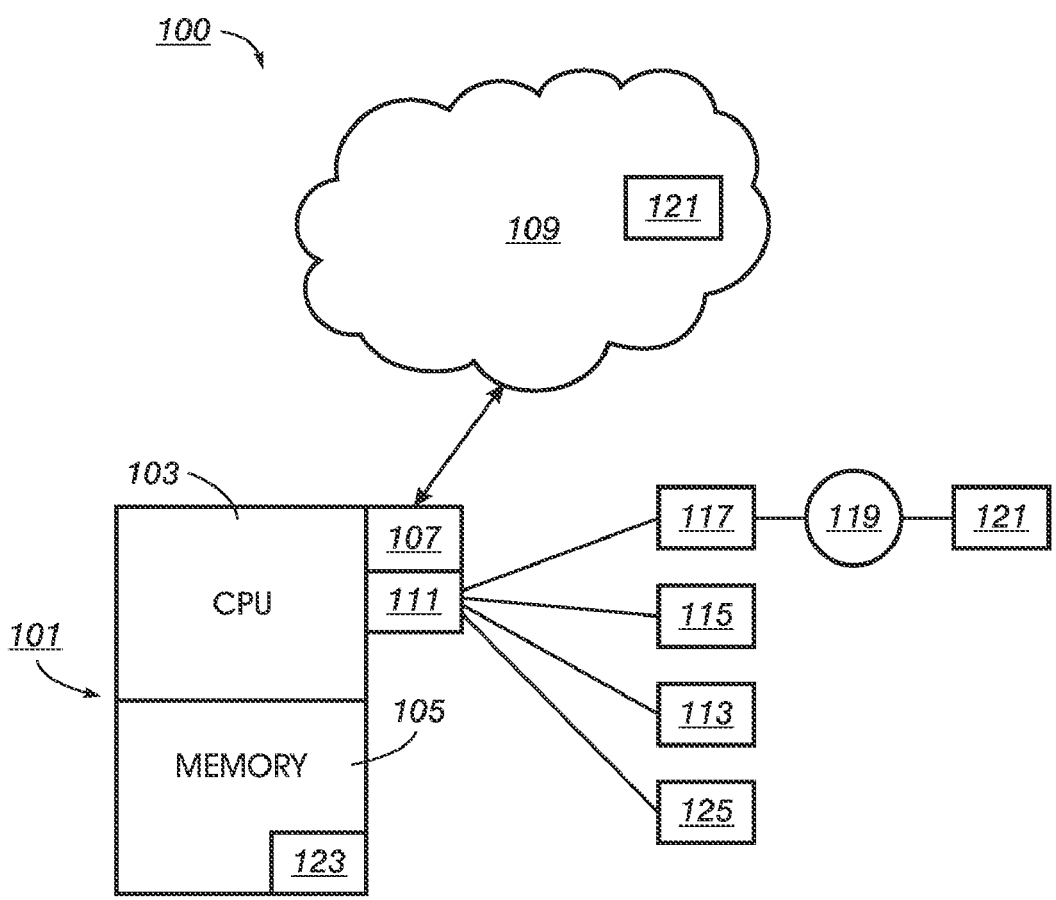
FIG. 1 illustrates a networked computer system in accordance with a preferred embodiment.

Aspects of the technology disclosed herein enable a knowledge worker to easily and efficiently develop and maintain a comprehension state of a document collection. One aspect of the technology includes a methods, apparatus, and program products that alter a relationship data structure representing a comprehension state responsive to manipulation, in a workspace window, of a first instance-representation of a first separately-movable instance object representing a first entity/relationship object in the relationship data structure.

Another aspect of the technology presents a workspace window responsive to a relationship data structure that represents a comprehension state including a presentation set of an ordered set of text strings from an electronic document. The presentation set can include one or more identified strings. The workspace window can then receive a quick-click command invocation on the one or more identified strings and modifies the relationship data structure by adding an entity/relationship object to the relationship data structure responsive to the quick-click command invocation and the one or more identified strings.

Yet another aspect of the technology presents a workspace window responsive to a relationship data structure that represents a comprehension state including a presentation of a first instance-representation that represents a first separately-movable instance object and a second instance-representation that represents a second separately-movable instance object. This aspect enables the first instance-representation and detects when the first instance-representation is dropped within a threshold distance of the second instance-representation. When the first instance-representation is dropped, the technology identifies, responsive to the step of detecting, one of a plurality of spatial relationships between the first instance-representation and the second instance-representation. Responsive to the identified spatial relationship, the technology selects an operation, and responsive to the operation modifies a composite object in the relationship data structure. The composite object incorporates an entity/relationship object that is represented by the first separately-movable instance object and an entity/relationship object represented by the second separately-movable instance object. After the composite object is modified, an instance-representation that represents the composite object is presented in the workspace window.

Still another aspect of the technology presents a workspace window responsive to a belief graph and a relationship data structure that represents a comprehension state by presenting an instance-representation of a first separately-movable instance object that represents a first entity/relationship object in the relationship data structure wherein the instance-representation of the first separately-movable instance object can be selected.

One aspect of the disclosed technology is a computerized tool that assists a knowledge worker in selecting entities (that can be categorized and rated) from undifferentiated text and maintaining relationships and inferences about the undifferentiated text. Once the entity information is available, the disclosed technology can assist the knowledge worker with finding and re-finding information about relevant relationships, provide recommendations of which relationships, passages, and electronic documents are likely to contain information of interest, provide aids to discovering relationships between the entities, and can provide reading aids that draw the knowledge worker's attention to important words, phrases, and passages in the document collection.

The embodiments disclosed herein use an object oriented programming paradigm. In such a paradigm, an object is an association between programmed methods and the data structures defined by a class and the instantiated storage that represents an object of the class. Classes can have superclasses and subclasses. One skilled in the art will understand that although the disclosure is cast within an object oriented paradigm, the techniques disclosed are applicable to other programming paradigms.

One embodiment of the disclosed technology provides improved computerized tools to analyze, organize, and visualize large heterogeneous information resources (such as a large document collection) and assist in discovering and understanding the information and information relationships within the resources that are of interest to a knowledge worker. By using such tools, knowledge workers are better able to mine, find, remember, and understand the information of interest buried within the information resources, and thus to make more informed decisions based on the available information. Some of these capabilities include information visualizations that aid inference of relationships based on relationships that are indirectly represented, aids to finding and re-finding relevant entities (such as person names, organization names, telephone numbers, addresses, city names, country names, state names, pathogen identifications, explosive types, currency values, etc.) and the relationships between the entities, capabilities that recommend which entities, passages, and documents the knowledge worker is likely to find useful to evaluate, aids for identifying relationships between entities, and reading aids that draw the knowledge worker's attention to important words, phrases, and passages related to the relationships and/or entities. These computerized tools are especially useful to intelligence analysts, lawyers, technology analysts, police investigators, private investigators, and those in the medical, financial, and research industries.

An entity is an information snippet that can carry categorized meaning. Thus an entity can be classified as a person, place, or thing, an action, a time, statute, citation, condition, medical condition, or other classification desired by the knowledge worker.

One embodiment enables knowledge workers to quickly capture entity and/or relationships from an electronic document using combinations of point-and-click and automatic entity extraction operations. Each captured entity is stored in a representation space. The knowledge worker quickly establishes relationships between one entity and another entity (or previously established relationship) by directly manipulating representations of the entities and relationships on a Graphical User Interface (GUI). In addition, the knowledge worker can create different strength relationships using GUI manipulations as well as by specifying the knowledge worker's degree-of-interest in the relationship and/or the entity.

In one embodiment, the GUI combines traditional GUI operations and entity extraction technologies to construct an explicit model of relationships between entities (such as people, places, organizations, phone numbers, etc.), relationships and combinations thereof. By using tools enabled by the model, the knowledge worker can better mine, discover, and be reminded of relationships and/or entities; can better identify and locate electronic documents in the document collection that support relationships and/or entities; can better discover relationships and/or entities; and can better identify electronic documents, relationships, and/or entities for follow-on evaluation. Thus, aspects of the technology assist the knowledge worker in finding and returning to interesting documents. One embodiment can be implemented using a general purpose computer (for example, one such as shown in FIG. 1).

FIG. 1 illustrates a computer system 100 that can incorporate an embodiment. The computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The user interface device(s) 113 can include a display device 125 and user input devices (not shown). The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Generally, the information is embodied within a carrier-wave. The term "carrier-wave" includes electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, is a computer-usable data carrier. One skilled in the art will understand that not all of the displayed features of the computer 101 need to be present for the all embodiments that implement the techniques disclosed herein.

Figure 2:
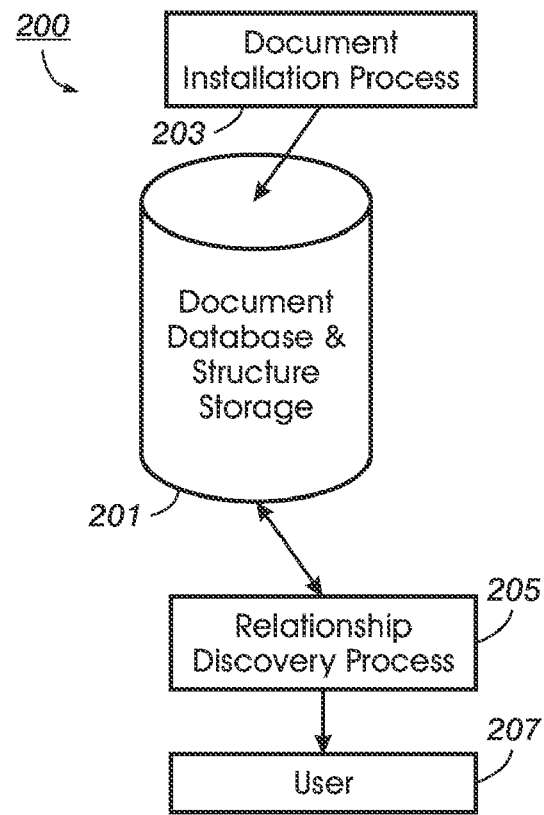
FIG. 2 illustrates an architecture that can be used with an embodiment.

FIG. 2 illustrates an architecture 200 that can include a document database and structure storage 201 that stores a document collection as well as state information about the relationships and/or entities found in the document collection. A document installation process 203 installs electronic documents into the document collection and can perform subsequently described processing to discover entities that could be of interest to a knowledge worker. A relationship discovery process 205 can be used by a knowledge worker 207 to discover and record the relationships and/or entities from the document collection that are of interest to the knowledge worker. The relationship discovery process 205 can also include tools to help the knowledge worker remember previously discovered relationships and/or entities and thus improve the knowledge worker's efficiency.

Figure 3:
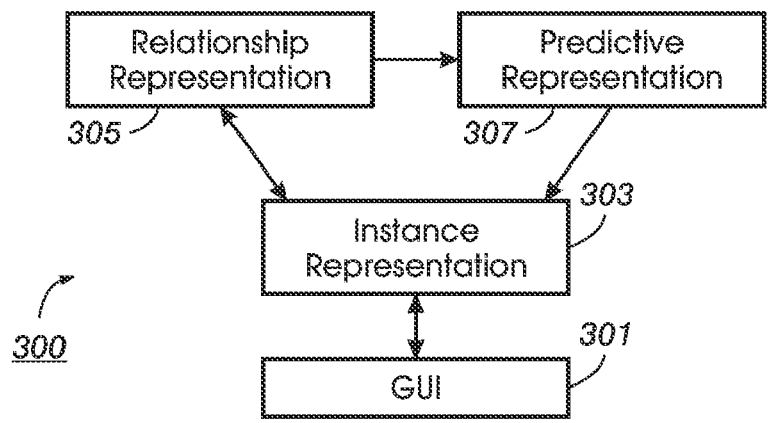
FIG. 3 illustrates representation space architecture.

FIG. 3 illustrates a representation space architecture 300 that can be used in an embodiment. A knowledge worker can interact with a graphical user interface 301 to manipulate entity/relationship objects (that represent relationships and entities) to discover and record new relationships between the entity/relationship objects, and/or previously discovered relationships. The user does this by manipulating presented instance-representations of separately-movable instance objects residing in an instance representation space 303 (as is subsequently described with respect to FIG. 5). The separately-movable instance objects represent entity/relationship objects in a relationship representation space 305. The relationship representation space 305 maintains one or more relationship data structures about the entities and their relationships from the document collection and/or from the knowledge worker's knowledge, belief, or hypothetical facts or hypotheses (as is also subsequently described with respect to FIG. 5). As the knowledge worker manipulates instance-representations the relationship data structures are altered accordingly. A belief representation space 307 includes a belief graph (as is subsequently described with respect to FIG. 6) that models the relationship data structures in the relationship representation space 305 and, among other purposes, enables the knowledge worker to use predictive/inference tools responsive to the structure of the relationship representation space 305 to help direct future investigation of the document collection. The disclosed technology also provides tools to achieve ranking, scoring, or analysis of the document collection. The representation space architecture 300 (in particular, the relationship representation space 305 and the belief representation space 307) maintains a comprehension state of the knowledge worker's understanding of, and inferences from, the document collection. The comprehension state is developed by the knowledge worker's manipulating instance-representations representing entity/relationship objects in the relationship representation space 305.

In the instance representation space 303 each entity/relationship object in the relationship representation space 305 can be represented by one or more separately-movable instance objects in the instance representation space 303. Thus, a entity/relationship object in the relationship representation space 305 can be represented multiple times on the GUI via multiple separately-movable instance objects, each of which represent the entity/relationship object in the relationship representation space 305. One skilled in the art would understand how to implement equivalent embodiments using other object-oriented programming or procedural programming methodologies. In the following, one skilled in the art will understand that the term "selected entity" means, for the embodiment described herein, that the knowledge worker has selected an instance-representation of a separately-movable instance object from the instance representation space 303 that represents an entity/relationship object in the relationship representation space 305. The entity/relationship object can represent either an entity or a relationship and the term selected entity implies either.

Figure 4:
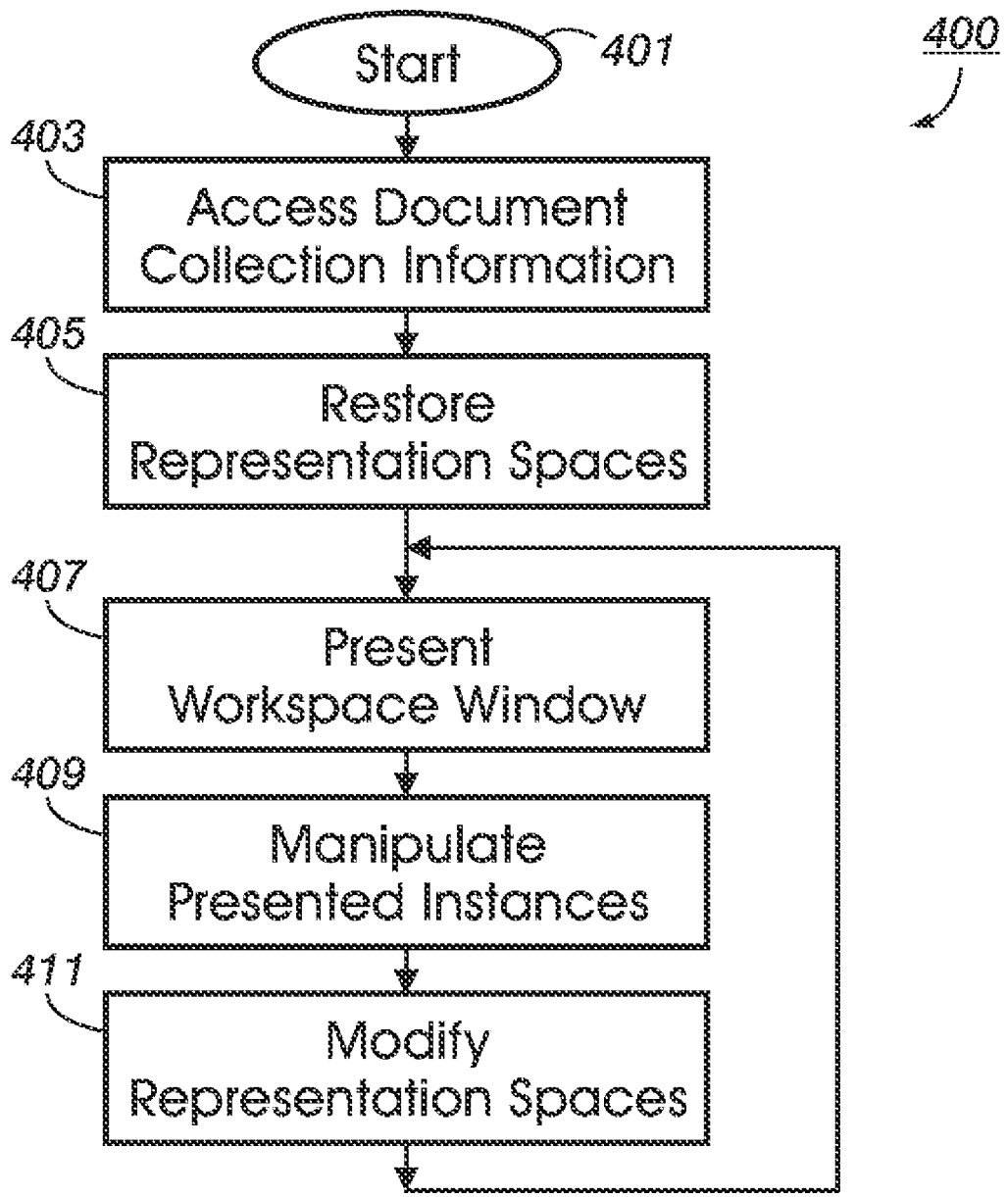
FIG. 4 illustrates an analysis process.

FIG. 4 illustrates an analysis process 400 that can be executed by a computer to assist the knowledge worker with the problem of capturing and classifying entities and their relationships from a document collection. The analysis process 400 initiates at a 'start' terminal 401 responsive to invocation by, for example, the knowledge worker. Once initiated, the analysis process 400 continues to an 'access document collection' procedure 403 that opens access to the electronic documents in the document collection. In addition, a 'restore representation spaces' procedure 405 initializes or retrieves a previously stored state of the representation spaces from storage. A 'present workspace window' procedure 407 can then present instance-representations on a workspace window 500 of separately-movable instance objects from the instance representation space 303 that, in turn, represent entity/relationship objects in the relationship representation space 305 (as is subsequently described with respect to the GUI of FIG. 5). A 'manipulate presented instances' procedure 409 allows the knowledge worker to manipulate the instance-representations in the workspace window 500. As the knowledge worker manipulates the instance-representations to select entities and define their relationships, the analysis process 400 continues to a 'modify representation spaces' procedure 411 that modifies the representation spaces responsive to the knowledge worker's manipulations. Then the analysis process 400 loops back to the 'present workspace window' procedure 407 to present updated instance-representations in the workspace window 500 responsive to the manipulations. The analysis process 400 continues until it is terminated by the knowledge worker or in response to a termination event.

Figure 5:
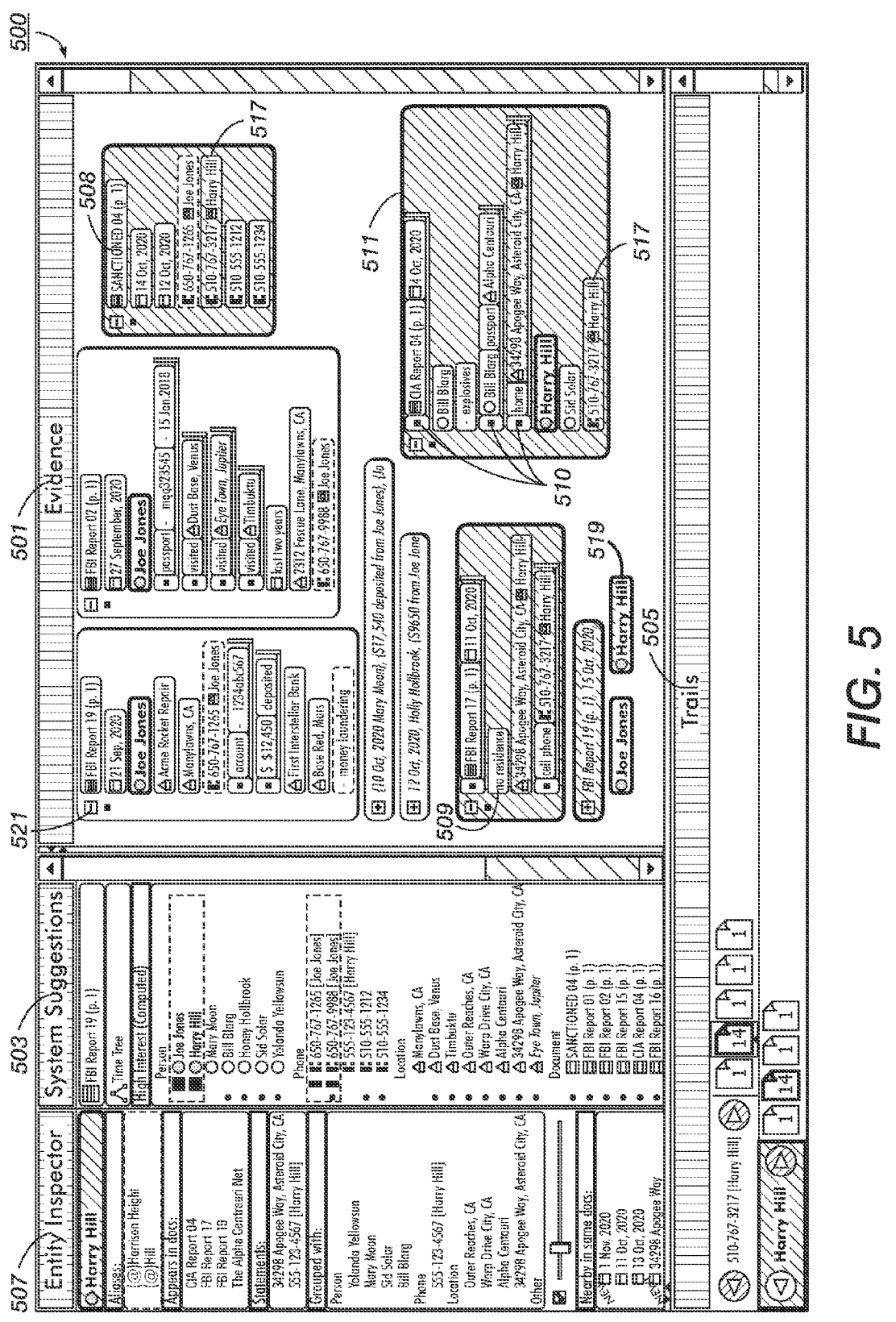

The GUI can present information from the relationship representation space 305 and/or the belief representation space 307 to the knowledge worker. The separately-movable instance objects representing objects in the relationship representation space 305 can be presented as corresponding instance-representations within the workspace window 500 such as illustrated by FIG. 5. The workspace window 500 can include an evidence panel 501 as well as other panels such as a system suggestions panel 503, a trails panel 505, and an entity/relationship object inspector panel 507.

The knowledge worker can use the workspace window 500 as a memory aid by using the evidence panel 501, the system suggestions panel 503, and the trails panel 505 to help remember what was previously learned from the document collection. In particular, each presented instance-representation (which represents an entity/relationship object) serves as a reminder for the knowledge worker of the relationships of, and the importance of, the relationships and/or entities contained in the entity/relationship object.

The evidence panel 501 presents instance-representations of separately-movable instance objects in the instance representation space 303 that represent entity/relationship objects in the relationship representation space 305. The knowledge worker can use the evidence panel 501 to define/modify the relationships between the entity/relationship objects by manipulating the instance-representations presented on the GUI.

The system suggestions panel 503 can present a list of recommended entity/relationship objects that may be of interest to the knowledge worker. This list results from analysis of the belief representation space 307 as is subsequently described with respect to FIG. 6. The trails panel 505 can identify electronic documents in the document collection which include text matching the entity(s) in the entity/relationship object represented by the selected instance-representation. The entity/relationship object inspector panel 507 can present, in an easy-to-scan single column, a list of other entity/relationship objects relevant to the entity/relationship objects represented by the selected instance-representation.

An entity/relationship object in the relationship representation space 305 can be multiply represented in the workspace window 500. Each representation of any given entity/relationship object, corresponds to a separately-movable instance object in the instance representation space 303 that presents an instance-representation in the workspace window 500 of the entity/relationship object. Thus, multiple representations of an entity/relationship object can be presented on the workspace window 500 to establish relationships. As is subsequently described with respect to FIG. 11, a command can be provided to the knowledge worker to make a new copy of any separately-movable instance object. That copy then acts like any other instance-representation representing that specific entity/relationship object, and the new instance-representation can be positioned on the workspace window 500.

The knowledge worker can place an instance-representation that represents one entity/relationship object within one or more other instance-representations to specify relationships between the entity/relationship objects so bundled. For example, the knowledge worker can manipulate the relationship representation space 305 by dropping an instance-representation representing an entity object onto an instance-representation that represents an evidence bundle object to bundle the entity object with other entity/relationship objects already contained in the receiving evidence bundle object. Such manipulation can be performed to add an entity/relationship object to separate evidence bundle objects, within instance-representations of separate belief statement objects, and both in and out of evidence bundle objects, and in and out of belief statement objects. Because all instance-representations of separately-movable instance objects representing an entity/relationship object represent the same entity/relationship object, the knowledge worker can use multiple instance-representations to relate the entity/relationship object to any number of other entity/relationship objects.

The knowledge worker can select an instance-representation using any commonly known GUI interaction device and/or method. In one embodiment, when an instance-representation is selected, the selected instance-representation and all instance-representations representing related and/or referenced entity/relationship objects in the relationship representation space 305 highlight in the evidence panel 501. In addition, all instance-representations representing composite objects that contain the corresponding entity/relationship object (and/or entity/relationship objects having a linked relationship with the selected entity/relationship object) can also highlight. Thus, the knowledge worker can be quickly reminded of and/or can quickly locate entities and relationships relevant to the entity/relationship object represented by the selected instance-representation. If multiple entity/relationship objects are selected, each instance-representation representing only one of the selected instance-representation can be highlighted with a color representing the color of the represented selected instance-representation. However, a different available highlight can be used when an instance-representation represents more than one of the selected instance-representations.

Instance-representations can also indicate a degree-of-interest value by icon, color, or other designation. For example, the degree-of-interest value displayed may be the value set by the knowledge worker. Alternatively, the degree-of-interest value can be determined from the knowledge worker's specified degree-of-interest values as adjusted by the belief graph (such as by spreading activation).

Highlighting can be performed by changing color, shape, font, size, style, brightness, or any other way of distinguishing one instance-representation from another. Thus, one skilled in the art will understand that the term "highlighting" includes the capability of displaying the highlighted text with a distinctive graphical property. For example, in one embodiment, instance-representations that are selected can be highlighted by applying a more distinctive highlight while instance-representations that are not selected can be dimmed, grayed out, or otherwise made less distinctive.

An entity/relationship object can be an entity object, a comment object, an electronic document object, a document page object, a composite object, an evidence bundle object, a belief statement object, etc. Relationships can be defined by some of these objects. For example, the evidence bundle object represents an evidence relationship between the bundled objects where the relationship strength is relatively weak; the belief statement object represents a statement relationship where the bundled objects have a stronger relationship than that of the evidence relationship; entities can be chained together to form a coupling relationship between the chained entities such that both entities are always presented whenever the first entity of the couple is presented. In some embodiments coupling is not symmetrical, while in others it is symmetrical. One example of coupled entities is the circumstance of coupling a person's contact information (such as a telephone number, an e-mail address, a mailing address, a work address, home address, etc.) to the person's name, such that the coupled name is presented whenever the contact information is presented.

Entity objects can be added to the relationship representation space 305 by dragging their respective instance-representation from the entity/relationship object inspector panel 507 or the system suggestions panel 503 to the evidence panel 501. In some embodiments, the knowledge worker can select a document page object instance 508 to invoke a document reader tool (see the subsequent description related to FIG. 9) to display the corresponding document page for the knowledge worker's reference. Entity objects can be added to the relationship representation space 305 by copying text (to be captured as an entity) from the document reader tool (as is subsequently described with respect to FIG. 7) using traditional cut-and-paste and drag-and-drop GUI operations as well as inventive "quick-click" operations that are subsequently described with respect to FIG. 10. In addition, the knowledge worker can type or copy any text string into the evidence panel 501 to create an entity.

In addition to manipulating instance-representations that represent entity objects, the knowledge worker can type or copy any text string into the evidence panel 501 to create a comment object in the relationship representation space 305. Comment objects help label and/or organize the entities and relationships in the relationship representation space 305. Presented instance-representations that represent comment objects are similar to instance-representations of entity/relationship objects, but, in one embodiment, do not present a entity-categorization icon and can be displayed with different colored text and background (such as a comment object instance 509). Comment objects in the relationship representation space 305 have similar characteristics to entity objects and can be included in composite objects but in one embodiment are not used to establish relationships between entities.

The system suggestions panel 503 presents a list of entity/relationship objects ordered responsive to the belief representation space 307 (as is subsequently described with respect to FIG. 6). Thus, the system suggestions panel 503 can provide recommendations to the knowledge worker of which entity objects are likely to be worth subsequent investigation.

In some embodiments the list in the system suggestions panel 503 can be sorted first by the entity-categorization (for example, such that all entity objects of type "person" precede all entity objects of type "phone-number" etc.), and then by the spreading activation scores of the fact nodes in the belief representation space 307 representing the entity objects in the relationship representation space 305. In some embodiments the system suggestions panel 503 can include an instance-representation of one or more document page objects at the top of the panel that can, but need not be, associated with the currently open pages in the document reader tool. In some embodiments, document page objects may also appear in a document page object section (not specifically labeled in FIG. 5) of the system suggestions panel 503, and ordered responsive to the belief representation space 307.

The trails panel 505 presents information about selected instance-representations of one or more entity/relationship objects by identifying electronic documents in the document collection that contain the selected entities. One embodiment presents one icon for each such electronic document and uses icon color and other graphical properties to indicate facts about the electronic document associated with the icon (for example, but without limitation, such as whether or not the knowledge worker has read the electronic document, whether or not the electronic document is open for reading, the number of pages in the electronic document, how highly the knowledge worker has rated the electronic document compared to other electronic documents in the document collection, and how many times the selected entities appear in the electronic document). In addition, the trails panel 505 state can be responsive to queries by the knowledge worker targeting, for example, a single entity, such as "Joe Jones", or multiple entities such as "Joe Jones" AND explosives AND "Harry Hill".

The entity/relationship object inspector panel 507 provides the knowledge worker with a summary of the information contained in or related to the entity/relationship object of a selected instance-representation. This information can include one or more of the text strings that represent the selected entity, any text strings that serve as aliases for the selected entity, references to any electronic documents that contain the selected entity, any belief statement object referencing the selected entity, other relationships from entity/relationship objects that are contained in the same evidence bundle object as the selected entity, and other entities from entity/relationship objects that are sourced from the same electronic documents as the selected entity.

The knowledge worker can select or operate on an entity/relationship object using any traditional GUI selection tool/method (for example, by clicking on the presented instance-representation that represents the entity/relationship object) or using quick-click commands as subsequently described with respect to FIG. 10, FIG. 11, and FIG. 12.

As previously described with respect to FIG. 3, the relationship representation space 305 can be presented in the evidence panel 501 through the presentation of instance-representations of separately-movable instance objects representing entity/relationship objects within the relationship representation space 305. Such a presentation can include a belief statement object (represented by a belief statement object instance 510) that defines a strong relationship between the members of the belief statement object, a evidence bundle object (shown by an evidence bundle object instance 511) that defines a less strong relationship between its members, a document page object that can be represented as a collection of at least one document page object such as the document page object instance 508; and a comment object that can be represented by the comment object instance 509.

Entities can also be linked together to form relationships (symmetrical or asymmetrical). Once such linked relationship is a coupling relationship. A coupling relationship instance 517 (in one embodiment) couples two entity/relationship objects such that when an instance-representation of the primary member of the couple is presented, an instance-representation of the secondary member of the couple is presented adjacent to that of the primary. Another linked relationship is an alias relationship (not shown) that defines that the entities in the alias relationship are the same. Entities linked by an alias relationship have the strongest relationship and are represented by a single fact node in the belief representation space 307.

Selecting one instance-representation can cause other instance-representations that reference the selected instance-representation to highlight (as indicated by hashing in FIG. 5 responsive to a selection of a 'Henry Hill' instance-representation 519).

Entity/relationship objects that are related to each other in some way can be placed within an evidence bundle object to create a relationship. For example, an evidence bundle object instance 521 in FIG. 5 indicates that "Joe Jones" is, in some way, connected to a phone number, a company, an FBI report document page, a date, a bank, etc.

In one embodiment, the class of an entity/relationship object is a superclass of the classes used to instantiate an entity object (that represents the entity selected by the knowledge worker and can include an entity-categorization and/or a degree-of-interest value), a comment object (that allows the knowledge worker to provide additional information that does not affect the relationships between the entities), a document page object (that maintains information about a page of an electronic document object), an electronic document object (that represents an electronic document from the document collection), and a composite object (that defines relationships between the entity/relationship objects bundled within the object). The class of the composite object is a superclass of the classes used to instantiate an evidence bundle object and a belief statement object (that represent different strength relationships between the entity/relationship objects bundled within the composite object).

Figure 6:
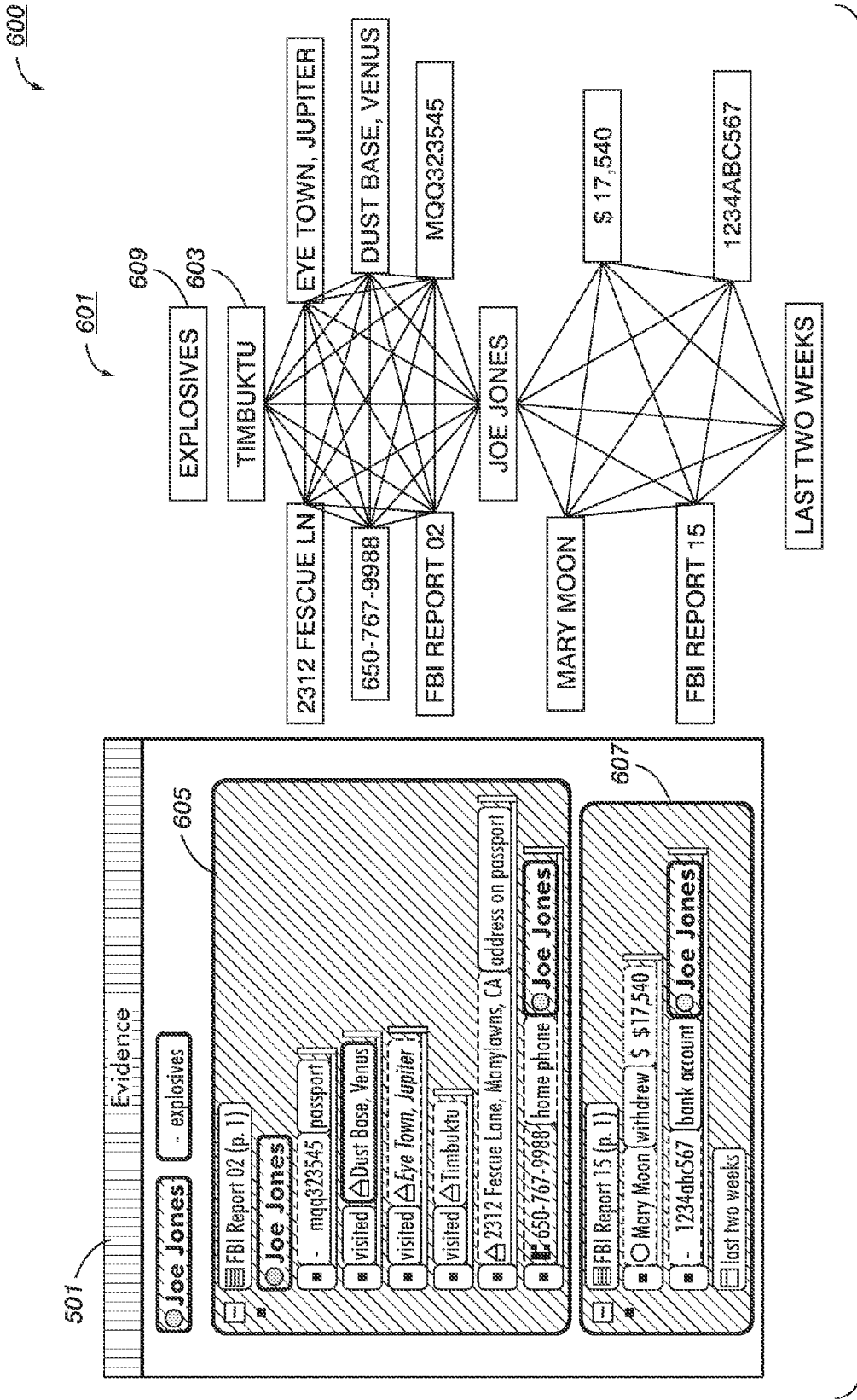
FIG. 6 illustrates the correspondence between the relationship representation space 305 (as represented on the workspace window) and a belief graph.

FIG. 6 illustrates a representation space relationship 600. As has been previously discussed, the belief representation space 307 includes a belief graph 601 (generally not displayed to the knowledge worker, but which is provided in FIG. 6 for explanatory purposes). The knowledge worker identifies entities and relationships by manipulating instance-representations on the evidence panel 501. The presentations of these instance-representations can be generated from separately-movable instance objects in the instance representation space 303. The entity/relationship objects in the relationship representation space 305 can be changed responsive to the knowledge worker's manipulation. The information from the relationship representation space 305 then can be used to generate/modify the belief graph in the belief representation space 307.

A presentation of the belief graph 601 is generally not useful to the knowledge worker because such a representation of the belief representation space 307 quickly leads to considerable screen clutter which makes it very difficult for the knowledge worker to analyze, manipulate, edit or use the belief representation space 307.

The relationship representation space 305 represents entities and relationships that the knowledge worker has determined to be important. Information about an entity can be stored in an entity object in the relationship representation space 305. Relationships between the entities, as determined or verified by the knowledge worker, are captured as composite objects in the relationship representation space 305. The evidence panel 501 in FIG. 6 can be used to present instance-representations of separately-movable instance objects from the instance representation space 303 which represent the entity/relationship objects in the relationship representation space 305. The relationship representation space 305 can be used to define the belief graph 601. The belief graph 601 represents the strength of the relationships between the entity objects in the relationship representation space 305.

The belief graph 601 can be an undirected graph having fact nodes representing entity objects (such as a Timbuktu entity fact node 603) and document page objects (not shown). Edges between fact nodes can be weighted by the strength of the relationship between pairs of fact nodes as determined from the interrelationships of the entity objects in the relationship representation space 305. Comment objects in the relationship representation space 305 do not become fact nodes, but become an edge property in the belief graph.

FIG. 6 also illustrates instance-representations of separately-movable instance objects representing a first evidence bundle object 605 and a second evidence bundle object 607 in the evidence panel 501 together with a visualization of the belief graph 601, which represents the relationships between the entities of the evidence bundle objects.

When generating the belief graph 601 from the relationship representation space 305, a weighted edge can be placed in the belief graph 601 between any two fact nodes that have a known relationship. The weighted edge represents a relationship between entity objects represented by the fact nodes connected by the weighted edge. In particular, a weighted edge can be placed between all pairs of fact nodes that share a composite object (such as an evidence bundle object or a belief statement object) in the relationship representation space 305. In addition, weighted edges may be added into the belief graph 601 responsive to information external to that provided via the evidence panel 501. For example, a weighted edge can be placed between fact nodes representing two entity objects if the text strings of the entities that were used to define the entity objects (or of their coupled objects) are near each other in one or more electronic documents in the document collection. No weighted edges attach to a fact node that corresponds to entity object that is not contained within a composite object or otherwise linked to other objects such as by a coupling relationship, an alias relationship, or co-occurrence in documents (as in the case of an explosives object 609). Entities within an alias relationship are represented by a single fact node in the belief graph 601.

Weighted edges can be given higher weight values if the joined fact nodes have a stronger relationship (for example, as determined from the type of composite object that contains the entity objects). For example, weighted edges that join fact nodes that represent entity objects that share a belief statement object can be weighted more heavily than weighted edges that join fact nodes that represent entity objects that share an evidence bundle object. Weighted edges joining fact nodes that represent entity objects that share multiple evidence bundle objects or multiple belief statement objects can be weighted more heavily than weighted edges joining fact nodes that represent entity objects that share only a single composite object. Weighted edges joining fact nodes that represent entity objects in a coupling relationship have even stronger weights. Entity objects in an alias relationship can be represented by a single fact node.

The belief graph 601 can also represent a relationship between co-occurrences of text represented by entity objects in separate electronic documents in the document collection. The knowledge worker can explicitly create a relationship between the entity/relationship objects from the separate electronic documents. In this situation the weighted edge can be more heavily weighted than weighted edges joining entity/relationship objects from the same electronic document. If the entity from one electronic document is the same as an entity from another electronic document, the knowledge worker can put the two entities into an alias relationship.

Once the belief graph is constructed in the belief representation space 307, the knowledge worker can then use tools enabled by the belief graph to provide recommendations and inference aids, such as was previously described with respect to the system suggestions panel 503 of FIG. 5.

In one embodiment, the ordering of the entity object in the system suggestions panel 503 can be determined using a spreading activation algorithm over the belief graph where the initial activation of each fact node in the belief graph can be computed from a degree-of-interest value property of the represented entity object (either as set by default or as explicitly specified by the knowledge worker). After application of the spreading activation algorithm (or other inference engine algorithm), the highest scoring fact nodes will include those that represent entity objects that were explicitly rated highly by the knowledge worker, those that were linked from highly rated entity/relationship objects by the shortest path of weighted edges, those with the most highly weighted edges to fact nodes that represent highly rated entity/relationship objects, those with multiple weighted edges to fact nodes that represent highly rated entity/relationship objects, or a combination of these factors.

Figure 8:
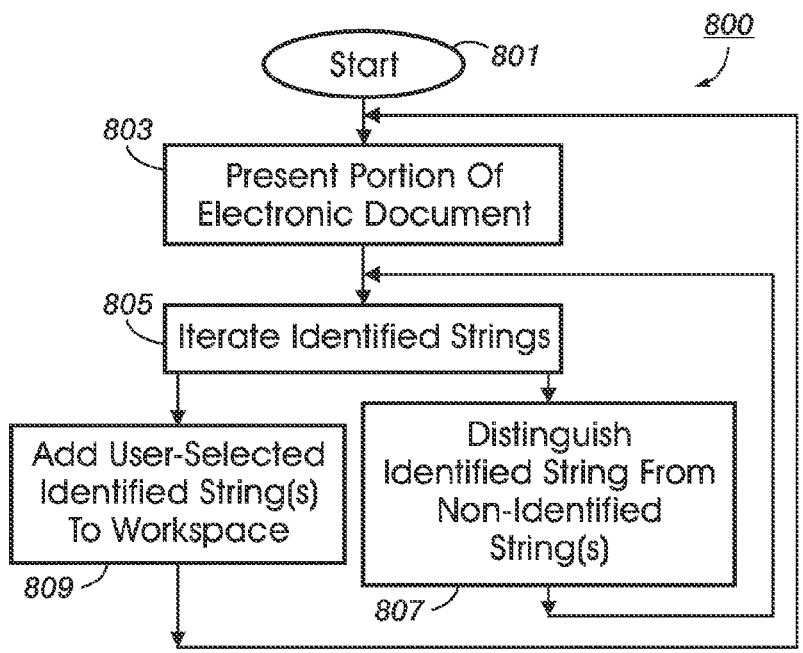
FIG. 8 an electronic document presentation process.
Figure 9:
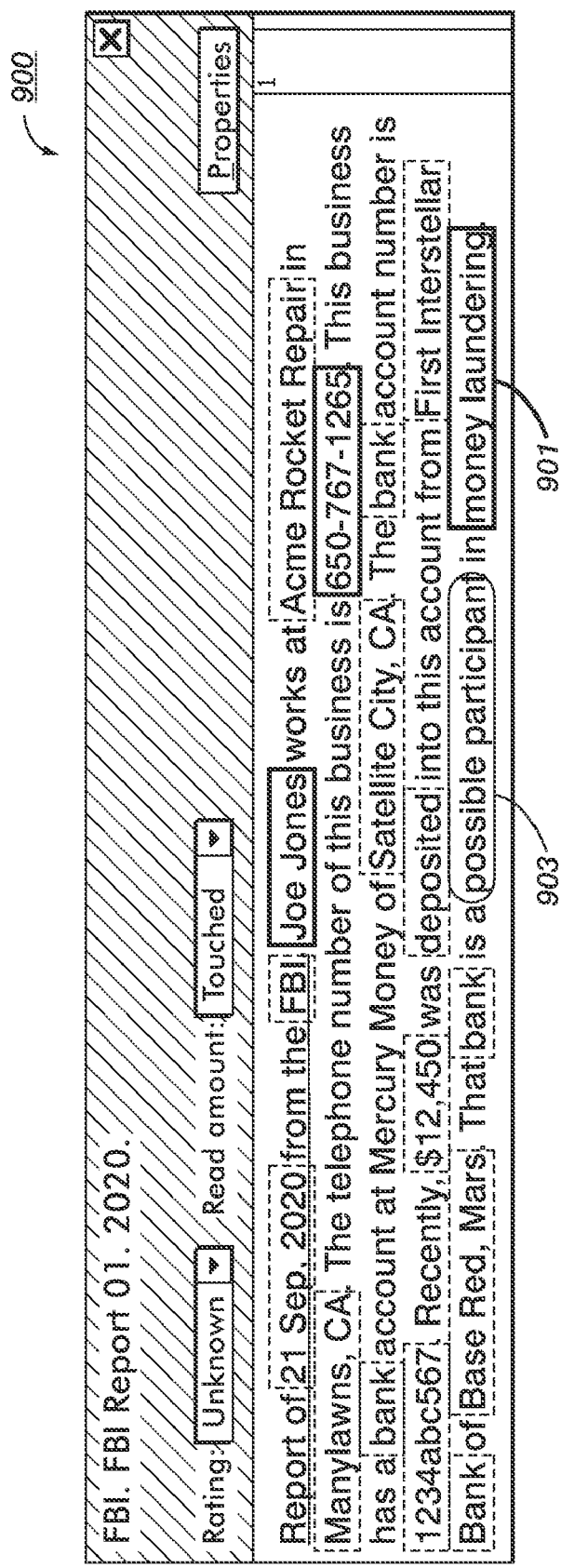
FIG. 9 illustrates a text presentation window used to present a portion of an electronic document.

Once the relationship representation space 305 is constructed from the entity/relationship objects, the knowledge worker can then use tools in the evidence panel 501 to quickly find, remember, and develop relationships between entities (including tools to assist the knowledge worker when scanning text for relationships such as provided by the document reader tool (that is discussed with respect to FIG. 8 and FIG. 9).

One way the technology assists the knowledge worker is that instance-representations of separately-movable instance objects can include a graphical indicator of the entity-categorization of the information or relationship contained in, or represented by, the represented entity/relationship object. Examples of entity-categorizations for the entity object include a person name, an organization name, a telephone number, an address, a city, a country, a state, a pathogen, a type of explosive, a currency value, etc.; or other information type. A corresponding graphical indicator for each entity-categorizations can be presented as well as a default graphical indicator for entity/relationship object that do not have a specified entity-categorization or that have an unknown entity-categorization.

One embodiment uses icons with the instance-representation to identify the entity-categorization of the entity. The entity-categorization can be specified by the knowledge worker when inserting the entity into the relationship representation space 305 or can be determined (or suggested) by the document installation process 203 (or other process for applying the rule database to the electronic document).

The knowledge worker, by manipulating the instance-representations presented by the GUI, can manipulate the separately-movable instance objects to establish relationships between entity objects(represented by the separately-movable instance object) and other relationships defined in the relationship representation space 305. For example, by placing a mouse cursor, pen tip, stylus tip switch, or other pointing device (or any other GUI selection tool or method) over one of the instance-representations, pressing a button, moving the pointing device, and releasing the button, the knowledge worker can position each instance-representation of a separately-movable instance object to define relationships in the relationship representation space 305 between the entity/relationship objects represented by the separately-movable instance object. These relationships can be used to weight edges between fact nodes in the belief graph.

Thus, relationships are created by the knowledge worker manipulating separately-movable instance objects to define an entity/relationship object establishing the relationship between multiple entity objects, between an entity object and an entity/relationship object, as well as between two entity/relationship objects (such as between composite objects and combinations of entity/relationship objects). The relationships can be manually or semi-automatically created by the knowledge worker, or automatically by the knowledge worker invoking a command such as a quick-click command (as is described with respect to FIG. 10). In addition, FIG. 12 illustrates a snap-together command mechanism that allows the knowledge worker to even more quickly create relationships between the entities.

By manipulating the instance-representations on the GUI, the knowledge worker creates a comprehension state of important entities and their relationships. The comprehension state reflects the current understanding of the document collection by the knowledge worker and/or his/her co-workers.

While the knowledge worker selects the entities from electronic documents for incorporation into the evidence panel 501; the disclosed technology also provides tools to assist with this task. These tools can include an initial-categorization tool that uses rules to identify potential entities and specify a default categorization.

Figure 7:
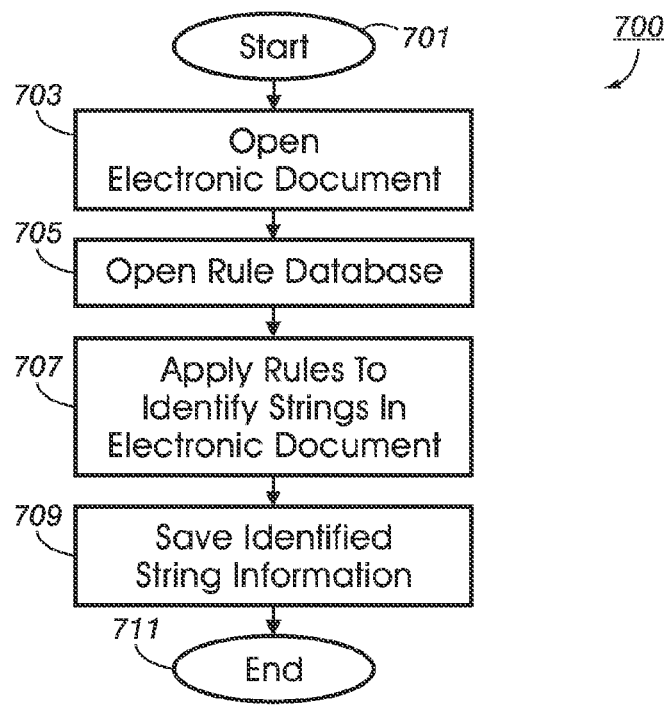
FIG. 7 illustrates an electronic document preparation process.

FIG. 7 illustrates an electronic document preparation process 700 that can be invoked by the document installation process 203 of FIG. 4; that initiates at a 'start' terminal 701 and continues to an 'open electronic document' procedure 703 to add/access an electronic document to/from the document collection. The electronic document includes an ordered set of text strings. The electronic document preparation process 700 can also open a rule database with an 'open rule database' procedure 705. An 'identify identified string' procedure 707 can apply rules from the rule database to the electronic document to recognize identified strings within the electronic document and a 'save identified string information' procedure 709 saves sufficient information to quickly locate the identified strings. The electronic document preparation process 700 exits through an 'end' terminal 711.

In some embodiments, the electronic document preparation process 700 can be used to process an electronic document to recognize the identified strings as the electronic document is being displayed. Furthermore, the rules can automatically assign an entity-categorization and/or degree-of-interest value to one or more of the identified strings. The knowledge worker can modify the entity-categorization and/or degree-of-interest value as desired.

Some embodiments enable the knowledge worker to specify an important text string to be added to the rules and provides the option of re-processing the document collection to incorporate the new rule.

FIG. 8 illustrates an electronic document presentation process 800 that can be invoked by the knowledge worker, initiates at a start terminal 801 and continues to a 'present electronic document portion' procedure 803 that presents some portion (the presentation set) of the electronic document selected by the knowledge worker. The electronic document presentation process 800 can be implemented within a document reader tool. An 'iterate identified strings' iterative procedure 805 subsequently or simultaneously locates each identified string in the presentation set and for each iterated identified string, can distinguish that string from non-identified strings via a 'distinguish identified string' procedure 807 (the string can be distinguished, for example, by highlighting, change of font style, change of text color, etc.). After the presented identified strings have been distinguished, an 'add user-selected distinguished identified string' procedure 809 enables the knowledge worker to designate a string (identified or not) as an entity and to directly or indirectly copy the selected string(s) to the evidence panel 501, which defines an entity object in the relationship representation space 305 that contains the selected string. Copying the string can be done, for example, by traditional drag-and-drop or cut/copy-and-paste operations as well as by the use of quick-click commands as is subsequently described with respect to FIG. 10.

The electronic document presentation process 800 can terminate (not shown) after the knowledge worker has finished defining entities or can loop to the 'present electronic document portion' procedure 803 to present additional portions of the electronic document. Additional portions of the electronic document can be presented by the knowledge worker changing the presentation set by scrolling or paging through the electronic document. Mechanisms for selecting identified strings are subsequently described with respect to FIG. 10. Select-drag-and-drop techniques for specifying a non-identified string as a selected string are well known in the art. In some embodiments, processing directed towards identified strings can be disabled if the knowledge worker explicitly selects the selected string.

The presented portion of the electronic document makes up a presentation set of the ordered set of text strings where one of the one or more identified strings within the presentation set is distinguished from a second subset of the presentation set (for example those strings that are not identified by the rules in the rule database). Each of the identified strings can also be (manually or automatically) assigned a categorization to identify what the identified string represents (such as a person, building, telephone number, address, etc.). The categorization can be used as the entity-categorization in an entity object.

For example, as shown by FIG. 9, a text presentation window 900 (presenting a portion of a fictitious FBI report) contains an identified text string 901 that uses yellow highlighting to distinguish the identified text string 901 from a non-identified text string 903. In FIG. 9 yellow highlighting is represented by a dashed box placed around the words that would be highlighted on the GUI. Red highlighting can be used to indicate entities of high interest to the knowledge worker. Red highlighting in FIG. 9 is indicated by boxes with bold borders. To determine which entities are of high interest, the document reader tool can access the belief graph when preparing the presentation of a portion of a document page object to detect entities that have a high degree-of-interest value. This enables the knowledge worker to more quickly scan an electronic document for information relevant to the knowledge worker or information that is included in the comprehension state.

One skilled in the art will understand that some embodiments apply the rules to the presented portion of the electronic document as that portion is being displayed while other embodiments can preprocess the complete electronic document with the rules prior to any portion of the electronic document being displayed. Still other embodiments can preprocess the electronic document by applying the rules prior to execution of the electronic document presentation process 800.

The rule database can include rules that identify strings that are important to the knowledge domain of the knowledge worker. For example, if the knowledge worker is an intelligence analyst, the rule database generally would include rules to identify the name of a person, the name of an organization, an address, a telephone number, a city, a country, a state, a pathogen, a type of explosive, and so on. If the knowledge worker were a patent attorney, the rules could identify terms or phrases used in the patent statute, the PTO rules, invention components etc. The rules can also assign a categorization to the identified string. Thus, the identified string "John Smith" can be associated with the categorization "person"; the identified string "703-555-1212" can be associated with the categorization "phone-number"; and so on. When the identified string is copied to the evidence panel 501 to define it as an entity in the relationship representation space 305, the categorization can be included in the separately-movable instance object as an entity-categorization.

Traditional methods of identifying and copying text to the evidence panel 501 are cumbersome and time consuming. Nevertheless, as previously discussed, the knowledge worker can insert an entity into the evidence panel 501 by selecting any text string and placing it into the evidence panel 501 using cut-and paste or drag-and-drop operations Variations of the paste operation allow the selected string to be added either as an entity or a comment; added as an entity object in the relationship representation space 305 and can be included within a composite object or linkage to create a relationship. In addition, an instance-representation of a document page object can be displayed near the workspace window 500 and the knowledge worker can drag one or more copies of the document page object into the evidence panel 501 where it can then be positioned in the evidence panel 501 or added to belief statement objects and/or evidence bundle objects. Furthermore, the knowledge worker can click at any position in the evidence panel 501 and insert a new entity object or comment object at that position. The knowledge worker can then input the text of the new entity object or comment object. Manual drag-and-drop or cut-and-paste operations are slow and tend to distract the knowledge worker from the analysis of the document collection.

Some embodiments include a quick-click command to speed the process of inserting entities into the relationship representation space 305. To invoke one of the available quick-click sub-commands, the knowledge worker can hold down a button (such as the Shift, Option, ALT, CTRL, etc. or a combination of buttons on a standard computer keyboard, or use a gesture, or other well-known GUI command invocation technique) while clicking on the word or phrase that is to be added as an entity. As soon as the click is complete, a copy of the selected word or phrase can be added to the relationship representation space 305 and can be presented in the evidence panel 501 through the instance representation space 303. Other quick-click sub-commands can be specified by using different, or different combinations of, buttons or other user controls.

Figure 10:
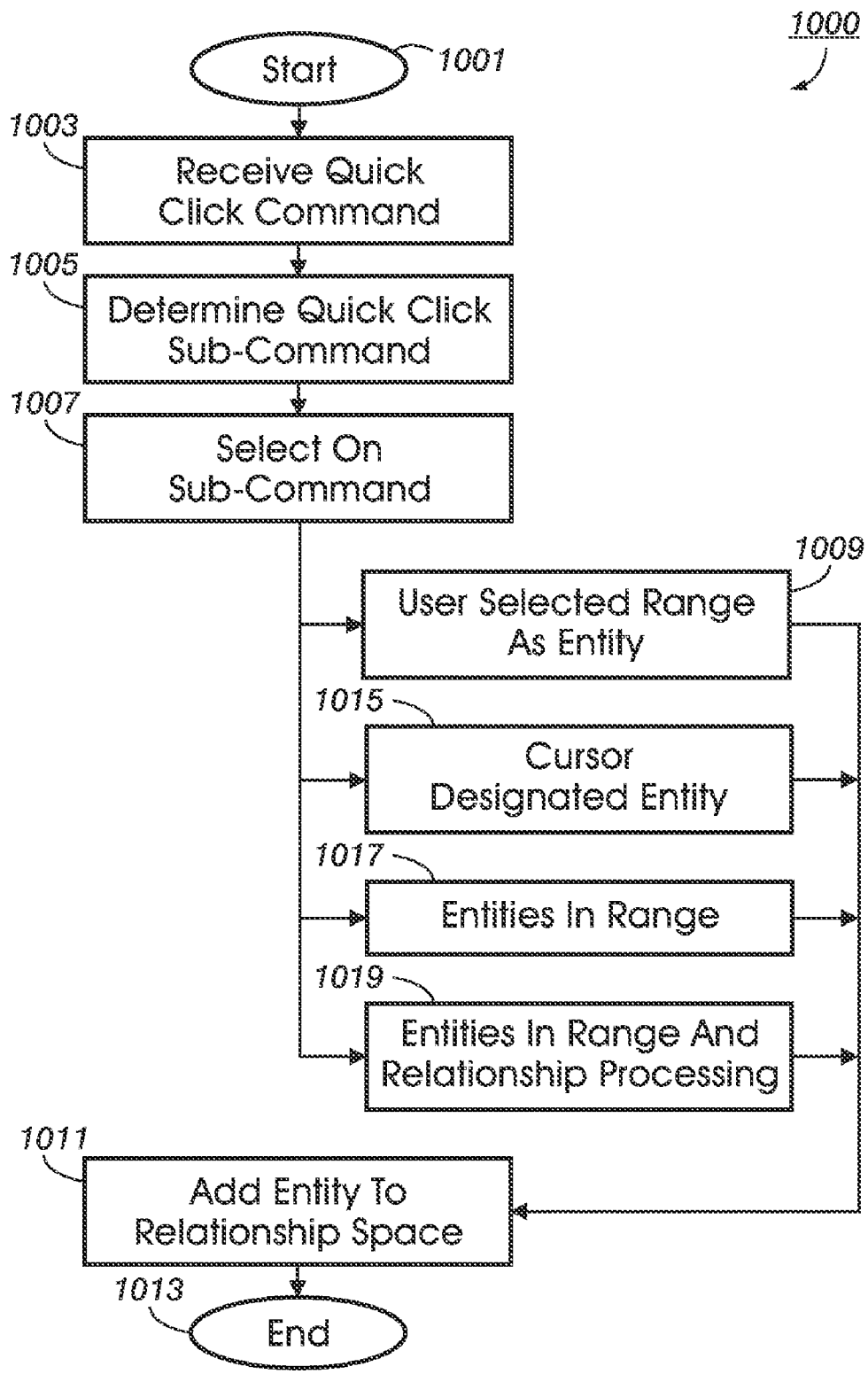
FIG. 10 illustrates a quick-click command process.

FIG. 10 illustrates a quick-click command process 1000 that the knowledge worker can invoke to quickly and efficiently select and enter a string from, for example, the text presentation window 900 into the evidence panel 501 (and hence create an entity object or entity/relationship object). The quick-click command process 1000 can be invoked responsive to the knowledge worker performing an action that posts a "quick-click" command event (or by any other method for performing a quick-click command invocation).

Once the commend event is posted, the quick-click command process 1000 initiates at a 'start' terminal 1001 and continues to a 'receive quick-click command' procedure 1003 that receives information about the posted command event. Once the command information is received, a 'determine quick-click sub-command' procedure 1005 uses that information to determine the specified quick-click sub-command. The command can be then dispatched by a 'select on sub-command' procedure 1007 that selects the procedure responsible for effectuating the quick-click sub-command. If the knowledge worker has selected specific text in the text presentation window 900—that is, if the knowledge worker has designated a user-selected subset of the ordered set of text strings from the electronic document (whether or not the user-selected subset is or contains an identified string or non-identified string) and the knowledge worker's cursor position intersects the user-selected subset then the quick-click command process 1000 continues to a 'user-selected range as entity' procedure 1009 that sets the selected string to be a copy of the user-selected subset.

Next, an 'add entity(s)' procedure 1011 creates an entity object (that can contain entity-categorization) in the relationship representation space 305 (and modifies the structure of the belief representation space 307 and the instance representation space 303 corresponding to the addition of the entity object in the relationship representation space 305). In one embodiment, if the selected string is already represented by a pre-existing entity object from the same electronic document, a separately-movable instance object representing the pre-existing entity object can be inserted into the instance representation space 303. If the selected string is sourced from a different electronic document than that of a pre-existing entity/relationship object, a new entity/relationship object can be created and the knowledge worker can be provided the opportunity to establish an alias relationship between the two entity/relationship objects. Some embodiments can include an "always alias" preference that automatically establishes an alias relationship between entities that have the same information from different electronic documents.

A sub-command of the quick-click command allows the knowledge worker to specify how the entity object is inserted into the relationship representation space 305. For example, responsive to one sub-command, the entity object can be added to an evidence bundle object that includes a document page object refers to the electronic document page that sourced the selected string. This sub-command creates such an evidence bundle object if one is not already available in the relationship representation space 305. One embodiment defaults to this sub-command to allow the knowledge worker to quickly manipulate the relationship representation space 305 without undue manipulation of the GUI input devices.

Subsequent quick-click commands on text selected from the same document page object can cause entity objects to be added to the same evidence bundle object. The 'add entity(s)' procedure 1011 can also allow the knowledge worker to specify an initial position in the evidence panel 501 to present the instance-representation of the newly inserted entity object. Some embodiments automatically set the initial position of the instance-representation. Some embodiments maintain an ordering aspect for newly created entity/relationship objects (such as by positioning the instance-representation of the newly added entity/relationship object in a non-overlapping position or by positioning the instance-representation in a reading order (such as left-to-right or top-to-bottom). Such embodiments reduce the knowledge worker's effort when manipulating the relationship representation space 305.

Once objects are added to the relationship representation space 305 the quick-click command process 1000 can post an event to refresh the evidence panel 501 and present instance-representations of separately-movable instance objects representing the newly added objects in the relationship representation space 305. Once the command is completed, the quick-click command process 1000 completes through an 'end' terminal 1013.

The operation of the 'user-selected range as entity' procedure 1009 and the 'add entity(s)' procedure 1011 automatically determines an insertion position and adds the selected text to the evidence panel 501 at that position (and automatically updates the representation spaces) as if the knowledge worker had copied the selected text from the text presentation window 900 window, activated the workspace window 500, selected the evidence panel 501 and pasted the copied text into the evidence panel 501.

If the quick-click sub-command specifies the cursor-identified sub-command, a 'cursor designated entity' procedure 1015 is executed that determines whether the knowledge worker's cursor position intersects an identified string in the text presentation window 900, a word of text, or neither. If neither, the command can be ignored, or an error message posted. Likewise, if the cursor position intersects a word of text (as separated from surrounding text by white space or punctuation, for example), the identified word can be automatically added to the evidence panel 501(and the representation spaces automatically updated) by the 'add entity(s)' procedure 1011 as previously described.

If the quick-click sub-command specifies the entities-in-range sub-command, an 'entities in range' procedure 1017 can be executed that locates all of the identified strings in the text presentation window 900 that intersect with, or are completely included within, the knowledge worker's selected text (the selection defines the range). Using this sub-command, one or more identified strings can be passed to the 'add entity(s)' procedure 1011 that automatically adds the identified strings to the evidence panel 501 (and automatically updates the representation spaces) and then relates the inserted entity objects (or separately-movable instance objects representing a pre-existing entity objects) with an evidence bundle object. Thus, when the instance representation space 303 is next presented (for example, in response to a evidence panel 501 update event), the instance-representation that represents the newly added entity object will be presented within a instance-representation that represents the evidence bundle object (indirectly through the instance representation space 303).

If the quick-click sub-command specifies the entities-and-relationships-in-range sub-command, an 'entities in range and relationships' procedure 1019 can be executed that locates all of the identified strings in the text presentation window 900 that intersect with, or are completely included within, the knowledge worker's selected text. In addition, the selected text can be linguistically processed to determine relationships between the identified strings. With this sub-command one or more identified strings and their relationships (as determined by the linguistic processing) can be passed to the 'add entity(s)' procedure 1011. This sub-command automatically adds the identified strings to the evidence panel 501 (and automatically updates the representation spaces), relates the relevant entity objects with an evidence bundle object as above, and further relates the relevant entity objects with belief statement objects responsive to their linguistic relationships. Thus, when the instance representation space 303 is next presented (for example, in response to a evidence panel 501 update event), the instance-representation of the newly added entity objects (or separately-movable instance objects representing a pre-existing entity objects) will be presented as instance-representations representing the belief statement objects within an instance-representation representing the newly added evidence bundle object.

The linguistic processing uses known techniques from computational linguistics to process the sentences in, or surrounding, the selected text to determine relationships between the identified strings (for example, but without limitation, such as "Person X has phone number Y", or "Person X works at a company Y", or "Person X is giving money to Person Y").

Note that the identified strings found by the electronic document preparation process 700 of FIG. 7 can be used by the cursor-identified sub-command, the entities-in-range sub-command, and the entities-and-relationships-in-range sub-command. This provides the knowledge worker with the ability to add the identified string(s) to the relationship representation space 305 with a single click. Without the identified string the program would not be able to determine how many words to copy nor which words to copy in response to a click. Note that if the knowledge worker clicks on a non-highlighted word in the text presentation window 900, quick-click will insert an entity object into the relationship representation space 305 that represents that single non-highlighted word (or if that entity object is pre-existing, then a separately-movable instance object representing the pre-existing entity object will be added to the instance representation space 303.

The evidence bundle object instance 521 of FIG. 5 illustrates the evidence bundle object that would be produced by clicking on most of the highlighted text strings in FIG. 9 in left-to-right top-to-bottom order.

Because the knowledge worker may sometimes wish to copy a phrase other than an identified string (or an identified string but with different starting or ending words than are included with the identified string), the knowledge worker can also select an arbitrary phrase (e.g., using well-known drag-select or any other method for selecting a sub-string from a document) and then quick-click on the selected phrase to invoke the 'user-selected range as entity' procedure 1009. Knowledge worker selection of a phrase takes precedence over identified strings found by, for example, the electronic document preparation process 700. Thus, the selected phrase can be added to the relationship representation space 305 as an entity object or a comment object, responsive to the sub-command of the invoked quick-click command.

All entity/relationship objects, evidence bundle objects and belief statement objects are editable (including those created using quick-click operations) such that the knowledge worker can reorder the contents of the object, add comment objects, combine entity/relationship objects into belief statement objects, and perform any other operations that the knowledge worker deems necessary in order to best represent the comprehension state of the document collection.

Some embodiments optionally add new quick-click selected strings by automatically recognizing the composite object that received previously selected strings from the same electronic document in which the new selected strings were found and selected.

Figure 11:
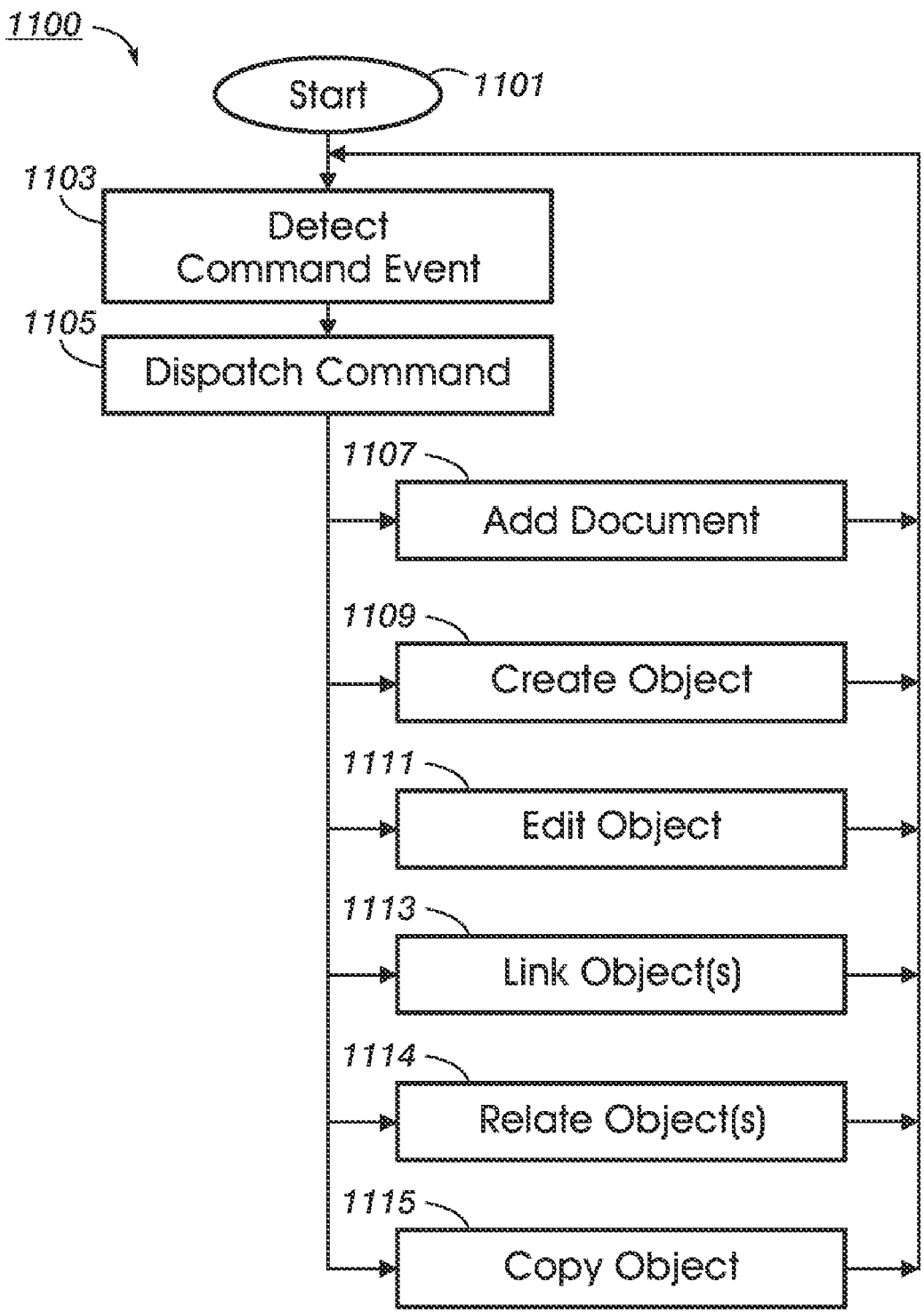
FIG. 11 illustrates a user-command dispatch process.

FIG. 11 illustrates a user command dispatcher process 1100 that can be used to implement some of the graphical user interface commands for the workspace window 500. The user command dispatcher process 1100 can be invoked when the workspace window 500 is first presented, initiates at a start terminal 1101 and continues to a 'detect command event' procedure 1103 that detects when the knowledge worker submits a command (such as by the press of a mouse button, a key, performance of a gesture, etc.). In many embodiments the command invocation can be detected by receiving an event. A 'dispatch command' procedure 1105 evaluates the detected command and dispatches the command to a procedure that causes the command to be performed.

An 'add document' procedure 1107 adds an electronic document to the document collection and initiates any pre-processing that may be needed on that document (for example, by invoking the electronic document preparation process 700). In addition the 'add document' procedure 1107 and/or the electronic document preparation process 700 can determine if the electronic document had been previously pre-processed by an out-of-date set of rules and, if so, can reprocess the electronic document with up-to-date rules.

A 'create object' procedure 1109 creates entity/relationship objects in the relationship representation space 305, creates separately-movable instance objects in the instance representation space 303 as needed, and updates the belief representation space 307 responsive to the changed relationship representation space 305. Examples of this class of commands include sub-commands or command modifiers of the cut-and-paste, drag-and-drop, insert comment, insert user-defined entity, and quick-click commands.

An 'edit object' procedure 1111 supports commands used by the knowledge worker to edit properties of objects in one or more of the representation spaces (for example, to change a degree-of-interest value or other property in the entity/relationship object, to change the display coordinate property in a separately-movable instance object, etc.).

A 'link objects' procedure 1113 implements relationship commands that allow the knowledge worker to change the relationships between entity/relationship objects. For example, this procedure could be used to invoke a coupling command and/or an aliasing command functionality to create or destroy coupling relationships and/or alias relationships.

A 'relate objects' procedure 1114 establishes relationships between entity/relationship objects in the relationship representation space 305, adjusts the separately-movable instance objects in the instance representation space 303 that represent the objects as needed, and updates the belief representation space 307 responsive to the changed relationship representation space 305. Examples of this class of commands include sub-commands or command modifiers of the cut-and-paste, drag-and-drop, insert comment, insert user-defined entity, and quick-click commands. The 'relate objects' procedure 1114 can be invoked by the 'create object' procedure 1109 (after it creates a composite object) to form a relationship between the entity/relationship objects represented by the manipulated instance-representations. In addition, the 'relate objects' procedure 1114 is invoked when the knowledge worker adds an entity/relationship object to an existing relationship (for example, by adding an entity object to a composite object).

A 'copy object' procedure 1115 implements commands that allow the knowledge worker to add an instance-representation (that represents an entity/relationship object) by duplicating a separately-movable instance object in the instance representation space 303. Once the selected command completes, the user command dispatcher process 1100 continues back to the 'detect command event' procedure 1103 to await the next command.

The user command dispatcher process 1100 can be used add, modify, alter, create, or destroy relationships resulting from composite objects.

While the user command dispatcher process 1100 was described in the context of an event driven and object-oriented graphical user interface, one skilled in the art would recognize that equivalent functionality could be provided using many other programming techniques.

Some of the commands handled by the user command dispatcher process 1100 include associating entity/relationship objects within an evidence bundle object or a belief statement object; relating separately-movable instance objects by a comment object, creating a coupling relationship or alias relationship between entities; inserting, deleting or modifying, an electronic document object, a document page object, a comment object, a composite object, an evidence bundle object, and a belief statement object within the relationship representation space 305.

As has been previously discussed, entity/relationship objects can be grouped together within an evidence bundle object using quick-click commands or traditional cut-and-paste, and drag-and-drop commands. One relationship command can be invoked by the knowledge worker placing one instance-representation of a separately-movable instance object in close vertical proximity (for example, within a threshold distance) to an instance-representation of a second separately-movable instance object. In some embodiments, the two entity/relationship objects represented by the separately-movable instance objects can be combined into a new evidence bundle object (if neither of the entity/relationship objects were already in an evidence bundle object). In a like manner the moved entity/relationship object can be added to an existing composite object. Further, composite objects can contain other composite objects such that the knowledge worker can combine belief statement objects and evidence bundle objects. The relationships of the objects in the relationship representation space 305 as manipulated by the knowledge worker can be then used to generate the belief graph in the belief representation space 307. One example of an implementation of a relationship command is illustrated by FIG. 12.

Some embodiments also detect when two instance-representations of separately-movable instance objects are placed in close horizontal proximity (for example, within the threshold distance) and can generate a belief statement object to assert a strong relationship between the two entity/relationship objects represented by the separately-movable instance objects (such as by the belief statement object instance 510 where, in this embodiment, the relationships/entities related by the belief statement object are presented side-by-side, underlined, and within bookend delimiters). Entity/relationship objects that are contained in the belief statement object have a stronger relationship than the relationship resulting when the entity/relationship objects are in an evidence bundle object and the strength of the relationship is reflected in the belief representation space 307.

Some entity/relationship objects have such a close relationship that the instance-representations of both entity/relationship objects are always presented together. In this situation the coupled entity/relationship objects can be placed in a coupling relationship. To define the coupling relationship in one embodiment, the knowledge worker uses the cursor to point to both instance-representations of the entity/relationship object in turn and invokes a "coupling" command. For example, in FIG. 5, if the knowledge worker decides that whenever an instance-representation of the phone number "650-767-1265" is presented, that an instance-representation of the name "Joe Jones" should also be presented, the knowledge worker can point to both instance-representations in turn and invoke a coupling command to create a coupling relationship between the entity/relationship objects represented by the instance-representations. An example of an instance-representation that represents two entity/relationship objects in a coupling relationship is the coupling relationship instance 517 in FIG. 5. The knowledge worker can, using the same selection process, instead invoke an aliasing command to create an alias relationship between the selected entity/relationship objects.

Thus, the relationships between entity/relationship objects or other objects in the relationship representation space 305 can be represented by the spatial proximity and graphical presentation markers (such as surrounding boxes to indicate an evidence bundle object, or by adding bookend and an underline to indicate a belief statement object) in the evidence panel 501 of the corresponding instance-representations.

Additional objects can be added to a composite object (such as the evidence bundle object and the belief statement object) after the composite object has been created. Instance-representations representing these additional objects can be positioned on or near the instance-representation representing the composite object to specify how the additional object is to be added to the composite object. In addition, the additional object may be added to, or used to create a belief statement object in an evidence bundle object if the additional object is also placed in close horizontal proximity to an instance-representation representing an entity object or to an instance-representation representing a belief statement object.

The knowledge worker can specify a degree-of-interest value for any entity/relationship object. The degree-of-interest value indicates the degree to which that relationship/entity is of interest to the knowledge worker.

The workspace window enables commands for setting the degree-of-interest value of each entity/relationship object. Entity/relationship objects can be initially given a degree-of-interest value that indicates "of possible interest". The process used to present the belief graph in the system suggestions panel 503 varies the presentation of the instance-representation based on the degree-of-interest value of the entity/relationship object to help the knowledge worker quickly identify high interest entities. The presentation can be varied by the use of color, size, shape, font, spatial relationship between instance-representations of separately-movable instance objects representing the entity/relationship objects, etc. The knowledge worker can alter the degree-of-interest value by designating an instance-representation of a separately-movable instance object and then modifying the contents of the entity/relationship object represented by the separately-movable instance object.

Figure 12:
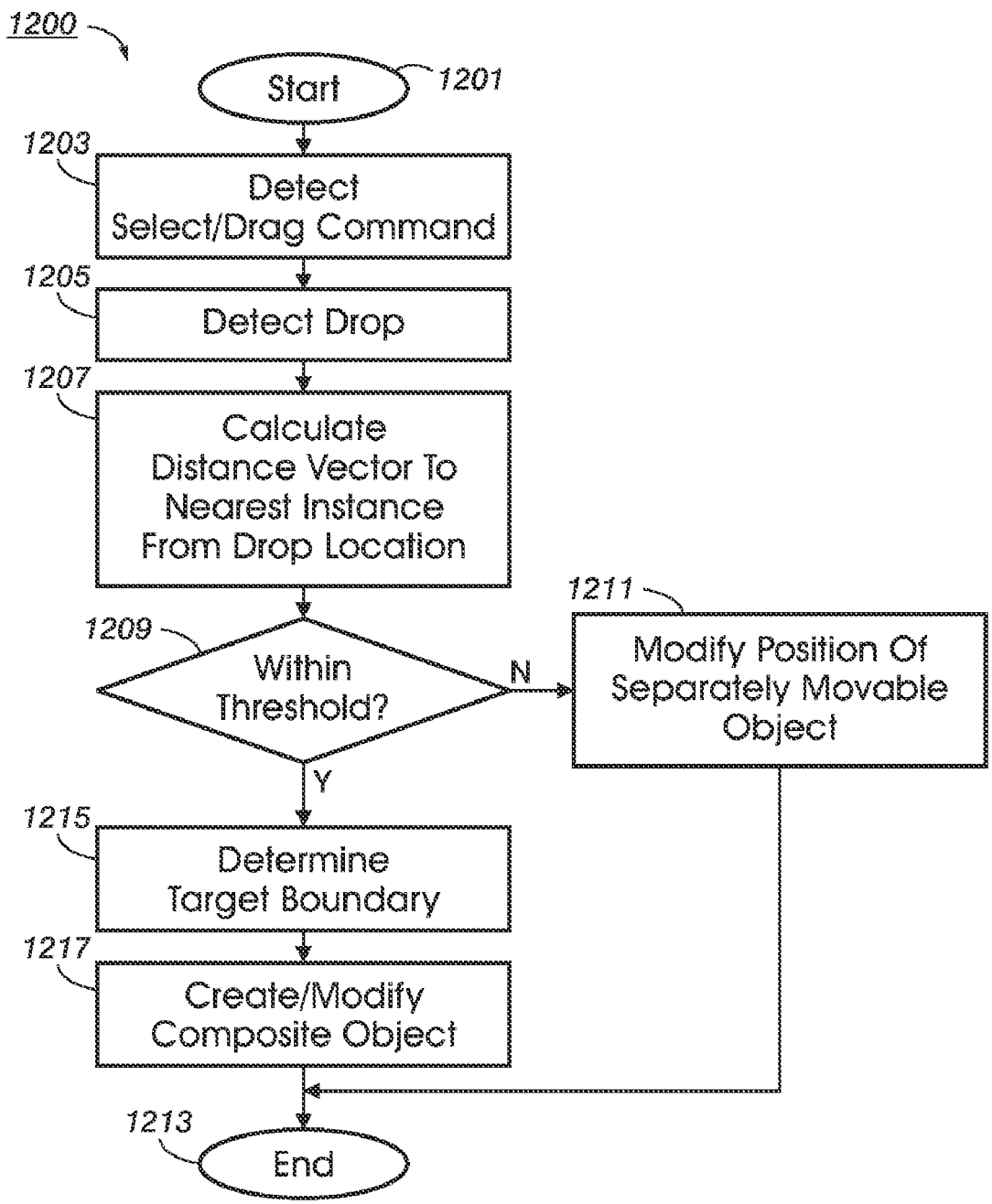
FIG. 12 illustrates one relationship command process.

FIG. 12 illustrates a relationship command process 1200 that can be invoked as part of a GUI command detection process and that initiates at a start terminal 1201. A 'detect select-drag operation' procedure 1203 detects whether the pointing device has selected and is currently dragging an instance-representation. If not, the relationship command process 1200 simply returns (not shown). If so, the relationship command process 1200 continues to a 'detect drop' procedure 1205 that determines when the knowledge worker drops the dragged instance-representation. When the instance-representation is dropped, the relationship command process 1200 continues to a 'compute distance to nearest instance' procedure 1207 that calculates a distance vector from the point of drop to other instance-representations and selects the nearest of the other instance-representations. Once the distance vector is calculated, a 'compute distance to nearest instance' procedure 1207 then can determine whether the nearest instance-representation is within a threshold distance.

If the length of the shortest vector is outside a threshold distance at the time of the drop, the relationship command process 1200 continues to a 'modify presentation position of dropped separately-movable instance object' procedure 1211 that changes the presentation position of the separately-movable instance object represented by the dragged instance-representation. The relationship command process 1200 then exits through an end terminal 1213.

If the length of the shortest vector is within the threshold distance at the time of the drop, the relationship command process 1200 continues to a 'determine target boundary' procedure 1215 that can determine which boundary of the nearest instance-representation is nearest to the drop point. A 'create/modify composite object' procedure 1217 then, responsive to which boundary of the nearest instance-representation is nearest the drop point, can create/modify a composite object—thus, the two instance-representations appear to "snap" together. If the nearest instance-representation is an entity object, a new composite object can be created that includes the entity object and the entity/relationship object represented by the dragged instance-representation. If the nearest instance-representation is a composite object the entity/relationship object represented by the dragged instance-representation can be added to the composite object or to an entity/relationship object bundled with the composite object. The strength of relationship created by the 'create/modify composite object' procedure 1217 (that is, whether the relationship is represented by an evidence bundle object, or a belief statement object) can be responsive to which border is nearest to the drop point. In some embodiments the drop point is the cursor location in the evidence panel 501 at the time the instance-representation is dropped.

In one embodiment, the positioning is such that operations related to statement relationships are given priority over evidence relationships. In this embodiment horizontal alignments are given priority over vertical alignments and thus belief statement object operations are preferred over evidence bundle object operations (that is invoked by a vertical alignment).

In some embodiments, when the instance-representation is in the process of being dragged, presentation aspects of non-dragged instance-representations can change when the position of the dragged instance-representation is sufficiently close to the non-dragged instance-representation. One embodiment changes the presentation aspect of the non-dragged instance-representations by highlighting those instance-representations (in an identifiable manner) to distinguish near instance-representations from instance-representations that are not sufficiently near to the dragged instance-representation. In addition, with respect to highlighted near instance-representations, instance-representations within the near instance-representation (that represent entity/relationship objects related by the highlighted near instance-representation) can also be highlighted responsive to whether they can be operated on by the dragged instance-representation. Thus, when the knowledge worker desires to add to an existing evidence bundle object, he/she can drop a dragged instance-representation anywhere in the existing order of entity/relationship objects within the evidence bundle object and can drop the instance-representation before, after, or in between (in the vertical dimension) the instance-representations representing the entity/relationship objects already in the evidence relationship. In a similar manner the knowledge worker can place the dragged instance-representation anywhere in the ordering of a belief statement object by dropping the dragged instance-representation before, after, or in between (in the horizontal dimension) the instance-representations representing the entity/relationship objects already in the statement relationship.

The threshold distance can be a multidimensional vector where the selection of the strength of the relationship can be responsive to weighted values of one or more of the vector's elements.

The previous description is directed to one embodiment for selecting a sub-command as applied to one instance-representation that is responsive to the relative position of a dropped instance-representation to the one. Thus, the determination of which border is nearest to the drop point is one embodiment of specifying spatial relationships (such as angular, or distance relationships in two dimensional display space, or of relationships in a velocity/position space) that can be used to distinguish one spatial relationship from another. Once the spatial relationship between the two instance-representations is determined, a command, sub-command, and/or command modifier can be invoked to perform an operation (responsive to the determined spatial relationship) on the entity/relationship objects in the relationship representation space 305 (that are represented by the two instance-representations). The operation can create a new composite object or alter an existing composite object.

Some embodiments are configured such that if the drop point is near a left or right edge of a target instance-representation the dropped entity/relationship object can be added to, or creates, a belief statement object within the entity/relationship object represented by the target instance-representation. In this embodiment, if the drop point is near a top or bottom edge of the target instance-representation, the dropped entity/relationship object can be added to, or creates, an evidence bundle object. If the drop point is near two edges, some embodiments have a preference as to which (left, right, top, bottom) edge, or pair of edges are preferred (such that the corresponding operation has a higher priority over the operations associated with the other edges). Some embodiments default to selecting "leaf" structures in the relationship representation space 305 from which to measure the vector. In other words, after a horizontal snap, the technology ensures that the entity/relationship object represented by the dragged instance-representation and the chosen stationary leaf entity/relationship object are in a statement relationship by associating these entity/relationship objects within the same belief statement object (and by creating a new belief statement object if needed). Likewise, after a vertical snap, the technology ensures that the entity/relationship object represented by the dragged instance-representation and the chosen stationary leaf entity/relationship object are in a evidence relationship by associating these entity/relationship objects within the same evidence bundle object (and by creating a new evidence bundle object if needed).

Other embodiments use various techniques well known to one skilled in the art to post a command selection responsive to a near drop event where one of the possible command selections is preferred over another of the possible command selections One skilled in the art, after reading the previously disclosed technology will understand that the document collection can be compactly summarized for/by the knowledge worker from information in the relationship representation space 305 and the belief representation space 307. One example of such a summarization is the construction of a timeline story related to the entities of high interest. For example, the user may position the evidence bundles in a left-to-right arrangement, sorted by date, in order to view a sequence of events in chronological order.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination. In particular one skilled in the art after reading this specification would understand how to implement, without undue experimentation, a relationship space edit logic, a presentation logic, a belief space access logic, a belief space edit logic, a degree-of-interest logic, a first update logic, a scoring logic, a rule logic, a quick-click command invocation logic, a user interface logic, a comparison logic, a linguistic processing logic, a command detection logic, a selection logic, and an instance representation space edit logic.

One skilled in the art will understand that the network transmits information (such as informational data as well as data that defines a computer program). The information can also be embodied within a carrier-wave. The term "carrier-wave" includes electromagnetic signals, visible or invisible light pulses, signals on a data bus, or signals transmitted over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology improves the ability of a knowledge worker to discover, remember, and summarize the comprehension state of a document collection.

From the foregoing, it will be appreciated that the technology has (without limitation) the following advantages:
1. Quick-click entity extraction reduces the time necessary to identify and select entities;
2. Automatic linguistically-supported creation of relationships reduces the time necessary to identify and specify relationships;
3. Snap-together relationship commands reduce the time necessary to specify a relationship;
4. Interactive editing of the comprehension state of a document collection through a user interface based on spatial grouping of entities and relationships reduces the time necessary to analyze and record information from a document collection;
5. Automated recommendation of relationships and documents for further investigation from analysis of the belief graph helps guide the knowledge worker to relevant areas of analysis;
6. Ability to couple entities such that the entities are always presented together assists the knowledge worker with making inferences and thus reduces the probability that a relationship will be overlooked;
7. Discovery of linked entities using distinctive highlighting of shared relationships reduces the knowledge worker's effort when examining presented entities and relationships;
8. Entity highlighting and dimming reduces the knowledge worker's effort when examining presented entities and relationships and when making inferences based on the presented information.
9. Highlighting of entities in a document based on degree-of-interest values specified by the knowledge worker simplifies the knowledge worker's task when reading a document;
10. Assists the knowledge worker in remembering/locating the source of entity information and entity details, and remembering relationships; and
11. Promotes sharing the comprehension state of the document collection between knowledge workers by providing an explicit representation of the comprehension state that can be shown to or given to other knowledge workers in whole or in part.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method comprising:

presenting a workspace window responsive to a relationship data structure that represents relationships between pieces of information;

presenting a presentation set of an ordered set of text strings from an electronic document, said presentation set including one or more identified strings;

receiving a quick-click command invocation on said one or more identified strings by said workspace window;

modifying said relationship data structure by adding an entity/relationship object to said relationship data structure responsive to said quick-click command invocation and said one or more identified strings;

detecting a drag-and-drop operation dragging a first instance representation to a drop point;

combining the first instance representation with a second instance representation, the second instance representation determined to be nearest to the drop point and within a threshold distance from the drop point, wherein the threshold distance is a multidimensional vector, a selection of strength of a relationship being responsive to weighted values of the multidimensional vector's elements, so that:

if the nearest instance representation is an entity object, a new composite object is created that includes the entity object and an entity/relationship object represented by the dragged instance representation, and if the nearest instance representation is a first composite object, the entity/relationship object represented by the dragged instance representation is added to the first composite object.

2. The computer controlled method of claim 1, wherein said entity/relationship object includes a reference to said electronic document.

3. The computer controlled method of claim 2, wherein said relationship data structure further comprises a second composite object, the method further comprising:

adding said entity/relationship object to said second composite object; and storing said reference to said electronic document from said entity/relationship object in said second composite object.

4. The computer controlled method of claim 2, wherein whether the second instance representation is within the threshold distance is determined by a compute-distance-to-nearest-instance procedure based on a calculated distance vector.

5. The computer controlled method of claim 1, wherein said entity/relationship object is an entity object that incorporates at least one of a user-selected subset of an ordered set of text strings from said electronic document.

6. The computer controlled method of claim 1, further comprising:

identifying one or more identified strings within an ordered set of text strings from said electronic document, and wherein said entity/relationship object incorporates at least one of said one or more identified strings.

7. The computer controlled method of claim 6, wherein said entity/relationship object is an entity object and one of said one or more identified strings intersects a user-positioned cursor.

8. The computer controlled method of claim 6, wherein said entity/relationship object corresponds to a second composite object and said one or more identified strings intersect a user-selected range of said ordered set of text strings.

9. The computer controlled method of claim 8, wherein said user-selected range intersects at least one sentence having a first identified string and a second identified string, the method further comprising:

automatically determining one or more relationships between said first identified string and said second identified string responsive to linguistic processing of said user-selected range; and inserting a belief statement object responsive to automatically determining said one or more relationships into said relationship data structure.

10. An apparatus having a central processing unit (CPU) and a memory coupled to said CPU comprising:

a user interface logic configured to present a workspace window responsive to a relationship data structure that represents relationships between pieces of information;

the user interface logic further configured to present a presentation set of an ordered set of text strings from an electronic document, said presentation set including one or more identified strings;

a quick-click command invocation logic configured to receive a quick-click command invocation on said one or more identified strings from the user interface logic;

a relationship space edit logic configured to modify said relationship data structure by adding an entity/relationship object to said relationship data structure responsive to said quick-click command invocation logic and said one or more identified strings;

a detecting logic configured to detect a drag-and-drop operation dragging a first instance representation to a drop point;

a combining logic configured to combine the first instance representation with a second instance representation, the second instance representation determined to be nearest to the drop point and within a threshold distance from the drop point, wherein the threshold distance is a multidimensional vector, a selection of strength of a relationship being responsive to weighted values of the multidimensional vector's elements, so that:

if the nearest instance representation is an entity object, a new composite object is created that includes the entity object and an entity/relationship object represented by the dragged instance representation, and if the nearest instance representation is a first composite object, the entity/relationship object represented by the dragged instance representation is added to the composite object.

11. The apparatus of claim 10, wherein said entity/relationship object includes a reference to said electronic document.

12. The apparatus of claim 11, wherein said relationship data structure further comprises a second composite object and the relationship space edit logic further comprises:

a first update logic configured to add said entity/relationship object to said second composite object and further configured to store said reference to said electronic document from said entity/relationship object in said composite object.

13. The apparatus of claim 11, wherein said relationship data structure further comprises a second composite object that includes a reference to said electronic document and the relationship space edit logic further comprises:

a comparison logic configured to match said entity/relationship object and said second composite object with respect to their respective references to said electronic document; and a first update logic configured to add said entity/relationship object to said second composite object responsive to the comparison logic.

14. The apparatus of claim 10, wherein said entity/relationship object is an entity object that incorporates at least one of a user-selected subset of an ordered set of text strings from said electronic document.

15. The apparatus of claim 10, further comprising:
a rule logic configured to identify one or more identified strings within an ordered set of text strings from said electronic document, and wherein said entity/relationship object incorporates at least one of said one or more identified strings.

16. The apparatus of claim 15, wherein said entity/relationship object is an entity object and the user interface logic is further configured to detect when a presentation of one of said one or more identified strings intersects a user-positioned cursor.

17. The apparatus of claim 15, wherein said entity/relationship object corresponds to a second composite object and the user interface logic is further configured to detect when a presentation of said one or more identified strings intersect a user-selected range of said ordered set of text strings.

18. The apparatus of claim 17, wherein said user-selected range intersects at least one sentence having a first identified string and a second identified string, the user interface logic further configured to automatically determine one or more relationships between said first identified string and said second identified string responsive to a linguistic processing logic configured to process said user-selected range; and to invoke the relationship space edit logic to insert a belief statement object into said relationship data structure responsive to the linguistic processing logic.

19. A computer program product comprising:
a computer-readable recording medium providing instructions that, when executed by a computer, cause said computer to perform a method comprising:
presenting a workspace window responsive to a relationship data structure that represents relationships between pieces of information;
presenting a presentation set of an ordered set of text strings from an electronic document, said presentation set including one or more identified strings;
receiving a quick-click command invocation on said one or more identified strings by said workspace window; and
modifying said relationship data structure by adding an entity/relationship object to said relationship data structure responsive to said quick-click command invocation and said one or more identified strings;
detecting a drag-and-drop operation dragging a first instance representation to a drop point;
combining the first instance representation with a second instance representation, the second instance representation determined to be nearest to the drop point and within a threshold distance from the drop point, wherein the threshold distance is a multidimensional vector, a selection of strength of a relationship being responsive to weighted values of the multidimensional vector's elements, so that:

if the nearest instance representation is an entity object, a new composite object is created that includes the entity object and an entity/relationship object represented by the dragged instance representation, and
if the nearest instance representation is a first composite object, the entity/relationship object represented by the dragged instance representation is added to the composite object.

20. The computer program product of claim 19, wherein said entity/relationship object includes a reference to said electronic document.

21. The computer program product of claim 20, wherein said relationship data structure further comprises a second composite object and further comprising:
adding said entity/relationship object to said second composite object; and
storing said reference to said electronic document from said entity/relationship object in said second composite object.

22. The computer program product of claim 20, wherein said relationship data structure further comprises a second composite object that includes a reference to said electronic document and further comprising:
matching said entity/relationship object and said second composite object with respect to their respective references to said electronic document;
adding said entity/relationship object to said second composite object.

23. The computer program product of claim 19, wherein said entity/relationship object is an entity object that incorporates at least one of a user-selected subset of an ordered set of text strings from said electronic document.

24. The computer program product of claim 19, further comprising:
identifying one or more identified strings within an ordered set of text strings from said electronic document, and wherein said entity/relationship object incorporates at least one of said one or more identified strings.

25. The computer program product of claim 24, wherein said entity/relationship object is an entity object and one of said one or more identified strings intersects a user-positioned cursor.

26. The computer program product of claim 24, wherein said entity/relationship object corresponds to a second composite object and said one or more identified strings intersect a user-selected range of said ordered set of text strings.

27. The computer program product of claim 26, wherein said user-selected range intersects at least one sentence having a first identified string and a second identified string, the method further comprising:
automatically determining one or more relationships between said first identified string and said second identified string responsive to linguistic processing of said user-selected range; and
inserting a belief statement object responsive to automatically determining said one or more relationships into said relationship data structure.

* * * * *

UNITED STATES PATENT AND TRADEMARK OFFICE
CERTIFICATE OF CORRECTION

PATENT NO. : 7,668,787 B2
APPLICATION NO. : 11/426915
DATED : February 23, 2010
INVENTOR(S) : Eric A. Bier It is certified that error appears in the above-identified patent and that said Letters Patent is hereby corrected as shown below:

Title page Item (73), change "Xerox Corporation, Norwalk, CT (US)" to "Palo Alto Research Center Incorporated, Palo Alto, CA (US)."

Signed and Sealed this

Eighth Day of June, 2010

David J. Kappos
*Director of the United States Patent and Trademark Office*